US008027352B2

(12) United States Patent
Noumi et al.

(10) Patent No.: US 8,027,352 B2
(45) Date of Patent: Sep. 27, 2011

(54) GATEWAY APPARATUS AND DATA MANAGING METHOD

(75) Inventors: Kaoru Noumi, Kobe (JP); Susumu Nishihashi, Kobe (JP); Tomoyuki Katou, Kobe (JP); Yukio Ishikawa, Kobe (JP); Yasuyuki Umezaki, Kawasaki (JP); Hidetaka Ebeshu, Kawasaki (JP); Shigeo Koide, Kawasaki (JP); Yukio Fujisawa, Tokyo (JP); Hiroaki Shimauchi, Tokyo (JP)

(73) Assignees: Fujitsu Semiconductor Limited, Yokohama-shi (JP); Renesas Technology Corporation, Kawasaki-shi (JP)

( * ) Notice: Subject to any disclaimer, the term of this patent is extended or adjusted under 35 U.S.C. 154(b) by 186 days.

(21) Appl. No.: 11/976,546

(22) Filed: Oct. 25, 2007

(65) Prior Publication Data
US 2008/0101393 A1 May 1, 2008

(30) Foreign Application Priority Data
Oct. 27, 2006 (JP) ................................. 2006-293370

(51) Int. Cl.
*H04L 12/66* (2006.01)
(52) U.S. Cl. ......................... 370/401; 370/218; 370/352
(58) Field of Classification Search .................. 370/401, 370/392, 352
See application file for complete search history.

(56) References Cited

U.S. PATENT DOCUMENTS

| 5,784,357 | A | * | 7/1998 | Wolker et al. ................. 370/218 |
| 5,793,976 | A | * | 8/1998 | Chen et al. .................... 709/224 |
| 2002/0073222 | A1 | | 6/2002 | Sonoda et al. |
| 2003/0103763 | A1 | * | 6/2003 | Sugimura et al. ............... 386/65 |
| 2005/0151880 | A1 | * | 7/2005 | Sullivan ........................ 348/500 |
| 2006/0259542 | A1 | * | 11/2006 | Wu et al. ....................... 709/202 |
| 2008/0267140 | A1 | * | 10/2008 | Lee et al. ...................... 370/337 |

FOREIGN PATENT DOCUMENTS

| EP | 1 158 718 A2 | 11/2001 |
| JP | A 10-13472 | 1/1998 |
| JP | A 2000-216814 | 8/2000 |
| JP | A 2001-527364 | 12/2001 |
| JP | A 2002-171293 | 6/2002 |
| JP | A 2002-176437 | 6/2002 |
| JP | A 2002-217960 | 8/2002 |
| JP | A 2005-051606 | 2/2005 |
| JP | A 2005-86693 | 3/2005 |
| WO | WO 99/33315 | 7/1999 |
| WO | WO 2005/111808 A2 | 11/2005 |

OTHER PUBLICATIONS

Jun. 7, 2011 Official Action issued in Japanese Application No. 2006-293370 with English translation.

* cited by examiner

*Primary Examiner* — Dang Ton
*Assistant Examiner* — Pamit Kaur
(74) *Attorney, Agent, or Firm* — Oliff & Berridge, PLC

(57) ABSTRACT

A gateway apparatus for performing transfer control of frame data between a plurality of different communication channels is provided with a time stamp unit for adding time stamp information to received frame data and a data discarding unit for determining processing delay of the frame data or abnormality of the apparatus by referring to the time stamp information and for deleting the time stamp information added to the frame data at the time of sending the frame data.

7 Claims, 36 Drawing Sheets

FIG. 12
(A)
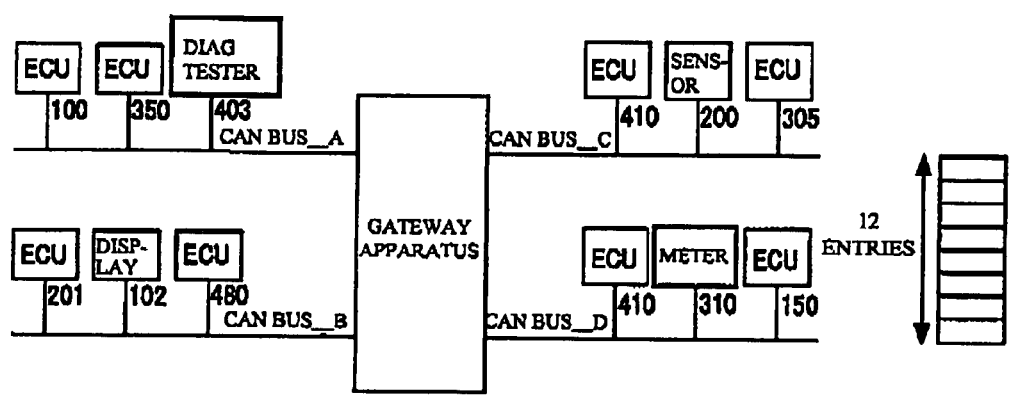
(B)
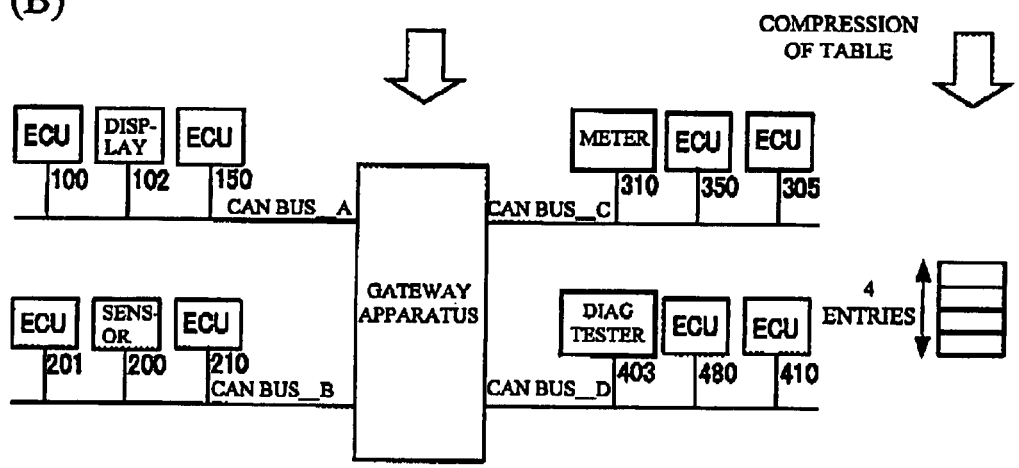
COMPRESSION OF TABLE

FIG. 18A

SELECTOR UNIT INPUT DATA

| IDE | RTR | CAN ID | DATA | DLC |
|---|---|---|---|---|
| 1BIT | 1BIT | 29BIT | 64BIT | 4BIT |

FIG. 18B

SELECTOR UNIT OUTPUT (DATA WITH TIME STAMP)

| RXCH | IDE | RTR | CAN ID | DATA | DLC | TS |
|---|---|---|---|---|---|---|
| 6BIT | 1BIT | 1BIT | 29BIT | 64BIT | 4BIT | * |

{ RXCH, IDE, RTR, CAN ID } DATA USED IN SEARCH ENGINE UNIT

*: MULTIPLE BITS

FIG. 18C

INFORMATION WRITTEN IN SENDING FIFO

| IDE | RTR | CAN ID | DATA | DLC | TS | LABEL |
|---|---|---|---|---|---|---|
| 1BIT | 1BIT | 29BIT | 64BIT | 4BIT | * | * |

*: MULTIPLE BITS

FIG. 18D

DATA READ BY CPU FROM SENDING FIFO

| IDE | RTR | CAN ID | DATA | DLC | TS | LABEL |
|---|---|---|---|---|---|---|
| 1BIT | 1BIT | 29BIT | 64BIT | 4BIT | * | * |

*: MULTIPLE BITS

FIG. 22

| | Address (32bit) | Par (1bit) | IDE (1bit) | RTR (1bit) | ID (29bit) | Par (1bit) | FIFO (1bit) | TxCH (6bit) | Label1 (8bit) | Label0 (2bit) | RxCH. (6bit) | MaskInfo (8bit) |
|---|---|---|---|---|---|---|---|---|---|---|---|---|
| Entry 1 | 0x***000+000 | * | 0 | 0 | 0x00000001 | * | 1 | 111111b | 0x00 | 00b | 111110b | 0x00 |
| Entry 2 | 0x***000+008 | * | 0 | 0 | 0x00000002 | * | 1 | 001111b | 0x01 | 00b | 110000b | 0x00 |
| Entry 3 | 0x***000+010 | * | 0 | 0 | 0x00000010 | * | 1 | 000001b | 0x02 | 01b | 000010b | 0x00 |
| Entry 4 | 0x***000+018 | * | 0 | 0 | 0x00000011 | * | 1 | 000010b | 0x03 | 01b | 000001b | 0x00 |
| Entry 5 | 0x***000+020 | * | 0 | 0 | 0x00000020 | * | 0 | 000011b | 0x04 | 01b | 001000b | 0x00 |
| Entry 6 | 0x***000+028 | * | 0 | 0 | 0x00000150 | * | 1 | 000001b | 0x05 | 10b | 001000b | 0x00 |
| Entry 7 | 0x***000+030 | * | 0 | 0 | 0x00000256 | * | 1 | 000111b | 0x06 | 10b | 111000b | 0x00 |
| Entry 8 | 0x***000+038 | * | 0 | 0 | 0x00000333 | * | 0 | 000100b | 0x07 | 01b | 000011b | 0x00 |
| Entry 9 | 0x***000+040 | * | 0 | 0 | 0x00000355 | * | 1 | 001010b | 0x08 | 01b | 000101b | 0x00 |
| Entry 10 | 0x***000+048 | * | 0 | 0 | 0x00000400 | * | 0 | 000010b | 0x09 | 01b | 000001b | 0x0F |
| Entry 11 | 0x***000+050 | * | 0 | 0 | 0x00000621 | * | 1 | 000001b | 0x10 | 00b | 000010b | 0x00 |
| Entry 12 | 0x***000+058 | * | 0 | 0 | 0x00000622 | * | 0 | 101100b | 0x11 | 00b | 000011b | 0x00 |
| Entry 13 | 0x***000+060 | * | 0 | 0 | 0x00000623 | * | 1 | 010010b | 0x12 | 10b | 000100b | 0x00 |
| Entry 14 | 0x***000+068 | * | 0 | 0 | 0x00000651 | * | 1 | 000110b | 0x13 | 10b | 000001b | 0x00 |
| Entry 15 | 0x***000+070 | * | 0 | 0 | 0x00000660 | * | 0 | 000110b | 0x14 | 11b | 001000b | 0x00 |
| Entry 16 | 0x***000+078 | * | 0 | 0 | 0x00000681 | * | 1 | 001010b | 0x15 | 11b | 010000b | 0x00 |
| Entry 17 | 0x***000+080 | * | 0 | 0 | 0x000005F3 | * | 1 | 001011b | 0x16 | 01b | 000100b | 0x00 |
| Entry 18 | 0x***000+088 | * | 0 | 0 | 0x00000700 | * | 1 | 000110b | 0x17 | 10b | 011000b | 0x7F |
| ... | ... | ... | ... | ... | ... | ... | ... | ... | ... | ... | ... | ... |
| Entry 384 | 0x*000+* | * | 1 | 0 | 0x00001000 | * | 1 | 000001b | 0x28 | 11b | 000110b | 0x00 |

FIG. 27A

| IDE | RTR | EPC | EXPANDED ID (0 WITH STANDARD ID) STANDARD ID | Data | Label0 | Res | DLC | Label1 | Data | Time Stamp | Data |
|---|---|---|---|---|---|---|---|---|---|---|---|
| 1bit | 1bit | 1bit | 11bit / 18bit | 16bit | 2bit | 2bit | 4bit | 8bit | 32bit | 16bit | 16bit |

FIG. 27B

| IDE | RTR | EPC | EXPANDED ID (0 WITH STANDARD ID) STANDARD ID | Data | Label0 | Res | DLC | Label1 | Data | Time Stamp | Data |
|---|---|---|---|---|---|---|---|---|---|---|---|
| 1bit | 1bit | 1bit | 18bit / 11bit | 16bit | 2bit | 2bit | 4bit | 8bit | 32bit | 16bit | 16bit |

GATEWAY APPARATUS AND DATA MANAGING METHOD

INCORPORATION BY REFERENCE

The disclosure of Japanese Patent Application No. 2006-293370 filed on Oct. 27, 2006 including the specification, drawings and abstract is incorporated herein by reference in its entirety.

BACKGROUND OF THE INVENTION

1. Field of the Invention

The present invention relates to a gateway apparatus mounted on a vehicle and relaying data between a plurality of networks, and also to a data managing method with the gateway apparatus.

2. Description of the Related Art

Recently, as shown in FIG. 33, a plurality of ECUs are mounted on vehicles, such as an engine ECU, a door controlling ECU, an airbag ECU, an audio ECU, and a navigation ECU. In order for these in-vehicle ECUs to have communications between a plurality of LANs having different communication systems and different communication speeds, a gateway apparatus is required.

A gateway apparatus implements gateway functions such as relaying data sent and received between a plurality of different networks by software control, conversion of communication protocols, and packet filtering. Thus communications between nodes connected to different networks are performed.

Information sent and received between ECU's is, however, more likely to be increased in amount with a result that there is a problem that processing time for each message and thus the staying time thereof in a gateway apparatus are increased.

In Japanese Patent Application Publication No. JP-A-10-13472, a technology is disclosed for storing a packet as well as a time stamp in a sending buffer, and for discarding the packet if it is a long time between receiving and sending the packet.

In the technology disclosed in Japanese Patent Application Publication No. JP-A-10-13472, time stamps are stored collectively in a sending buffer and a packet is discarded by referring to the time stamp information in the sending buffer when it is necessary.

In a gateway apparatus which has a plurality of communication channels and implements data transfer between the channels, a processing unit provided with each channel refers to a sending buffer, with a result that delay occurs in the processing. When referring to the time stamp, it is necessary for a processing device of each channel to exchange the address information of the sending buffer, with a result that the processing becomes complicated.

SUMMARY OF THE INVENTION

In view of the foregoing circumstances, the present invention provides a gateway apparatus and a data managing method by which referring to the time stamp information is performed without delay and determining processing delay of frame data and abnormality within the apparatus is performed quickly.

In order to achieve the aforementioned object, a gateway apparatus according to a first aspect of the present invention is a gateway apparatus which performs transfer control of frame data between communication channels, and includes a time stamp adding unit for adding time stamp information to received frame data, a determining unit for determining processing delay of the frame data or abnormality of the apparatus by referring to the time stamp information, and a deleting unit for deleting the time stamp information added to the frame data at a time of outputting the frame data after routing.

This structure enables to determine processing delay of frame data and abnormality within the apparatus by adding time stamp information to received frame data.

Time stamp information is added to frame data per se, and therefore the time stamp information can be referred to without delay, and processing delay of the frame data and abnormality within the apparatus can be determined quickly.

When sending the frame data, the time stamp information is deleted and therefore the data is sent without information unnecessary for the destination, with a result that processing time in the destination can be reduced.

According to a second aspect of the invention, with regard to the first aspect of the invention, the time stamp adding unit may be used commonly to a plurality of communication channels.

By using a common time stamp to a plurality of communication channels, time for synchronizing time stamps between the communication channels can be saved. Moreover, it is not necessary to provide a time stamp adding unit for each of a plurality of communication channels, and therefore the construction of the apparatus can be simplified.

According to a third aspect of the invention, the apparatus according to the first or second aspect of the invention may also include a data discarding unit for discarding frame data of which processing delay is determined to be occurring by the determining unit.

Thus, data which is unnecessary because of the occurrence of processing delay can be discarded.

According to a fourth aspect of the invention, the apparatus according to any one of the first to third aspects of the invention may also include a separating unit for separating the frame data with the time stamp information into the time stamp information and the frame data, a first accumulating unit for accumulating the frame data separated by the separating unit, and a second accumulating unit for accumulating the time stamp information separated by the separating unit, and the frame data accumulated in the first accumulating unit may be sent at the time of outputting.

By accumulating time stamp information and frame data in separate accumulating units, only the frame data can be sent to a destination.

According to a fifth aspect of the invention, the apparatus according to any one of the first to fourth aspects of the invention may also include a resolution modifying unit for modifying a resolution of time information added as the time stamp information.

Resolution of time information can be thus modified, and therefore processing delay time can be managed according to the type of frame data.

According to a sixth aspect of the invention, the apparatus according to any one of the first to fifth aspects of the invention may also include a distributing unit for distributing the input frame data to frame data to be processed by a program-controlled controlling unit and frame data to be processed by hardware, the program-controlled controlling unit for further dividing the divided frame data according to transfer destination, and a search engine unit for dividing the frame data with the time stamp information according to transfer destination.

Thus, dividing of the frame data according to transfer destination can be performed by program control and by hardware.

According to a seventh aspect of the invention, the apparatus according to the sixth aspect of the invention may also include a selector for adjusting timing to input the frame data transferred from the plurality of communication channels to the search engine unit.

Thus, a search engine unit can be shared by a plurality of communication channels.

A data managing method according to an eighth aspect of the invention includes adding time stamp information to received frame data, determining processing delay of the frame data or abnormality of an apparatus by referring to the time stamp information, and deleting the time stamp information added to the frame data at a time of sending the frame data.

Thus, by adding time stamp information to received frame data, the method enables to determine processing delay of the received frame data and abnormality within the apparatus.

The time stamp information is added directly to the frame data, and therefore it is not necessary to perform complicated processing for referring to the time stamp information.

At the time of sending the frame data, the time stamp information is deleted and therefore the data is sent without information unnecessary for the destination, with a result that processing time in the destination can be reduced.

According to the present invention, referring to the time stamp information can be performed without delay and determining processing delay of the frame data and abnormality within the apparatus can be performed quickly.

BRIEF DESCRIPTION OF THE DRAWINGS

FIG. 12 is another illustration diagram of the masking process;

FIGS. 18A through 18D are illustrations showing configurations of frame data processed in the gateway hardware macro section;

FIG. 22 illustrates an example indicative of a routing map recorded in a map memory;

FIGS. 27A and 27B illustrate the configuration of frame data;

DETAILED DESCRIPTION OF THE PREFERRED EMBODIMENTS

Referring to the attached drawings, a preferred embodiment of the present invention will be described.

First Embodiment

Figure 1:
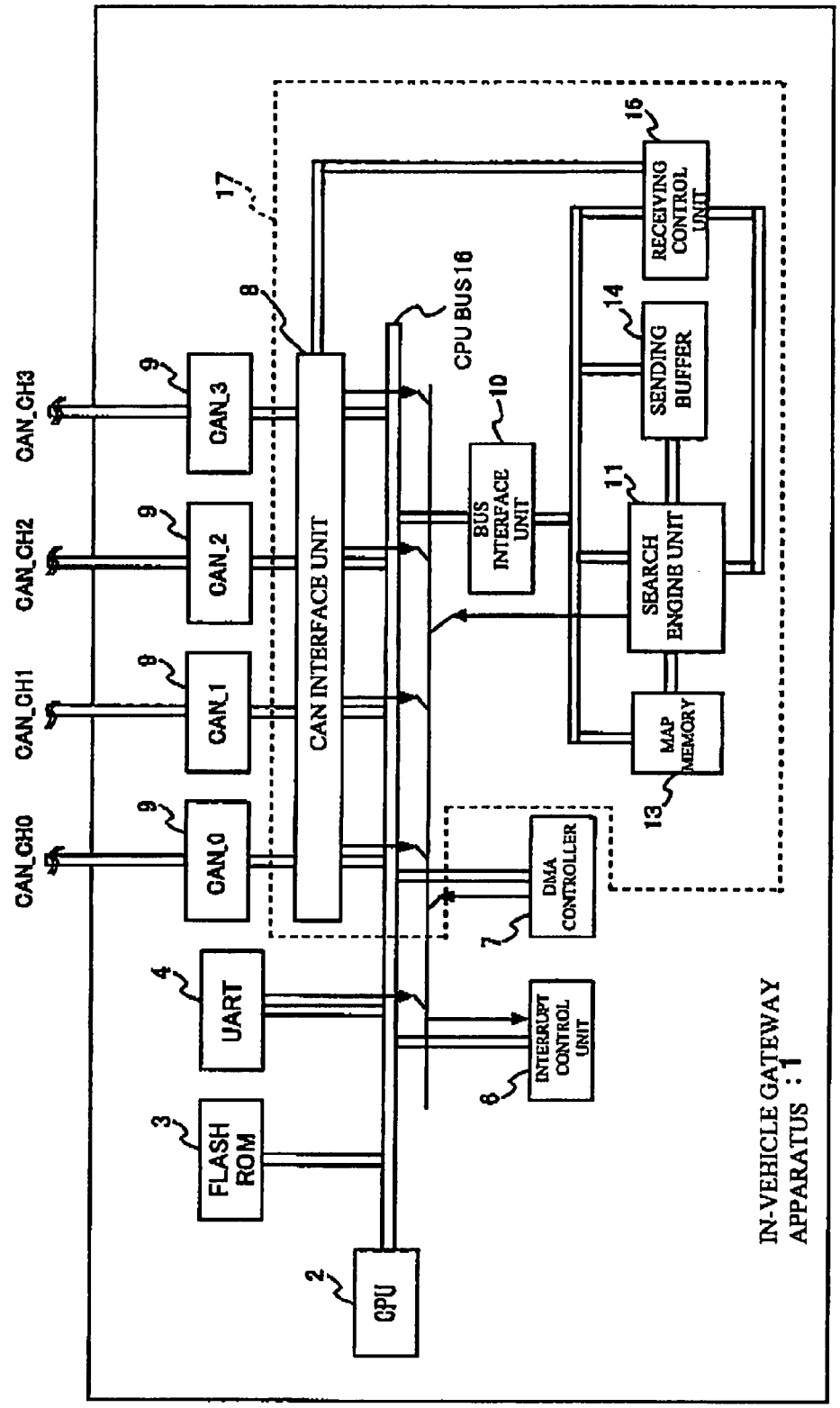
FIG. 1 is a block diagram showing a configuration of an in-vehicle gateway apparatus.

First referring to FIG. 1, the construction of the present preferred embodiment will be described. FIG. 1 shows the construction of an embodiment of a gateway apparatus of the present invention applied to an in-vehicle gateway apparatus for communication by CAN (Controller Area Network) protocols. In the in-vehicle gateway apparatus 1 shown in FIG. 1, a CPU bus 16 is connected with a CPU 2, a flash read only memory (ROM) 3, a universal asynchronous receiver transmitter (UART) 4, an interrupt control unit 6, a DMA controller 7, a CAN interface unit 8, a plurality of CANs 9 (while four CAN of CAN_0, CAN_1, CAN_2 and CAN_3 are shown in a second embodiment, the number of CANs is not limited to this), a bus interface unit 10, and the like. The bus interface unit 10 is connected with a search engine unit 11, a map memory 13, a sending buffer 14 and a receiving control unit 15. The search engine unit 11, the sending buffer 14 and the receiving control unit 15 are connected by data lines which input and output data from and to the CPU bus 16 via the bus interface unit 10. Between the search engine unit 11 and the sending buffer 14 and between the search engine unit 11 and the receiving control unit 15 are also connected by data lines. The receiving control unit 15 is connected with the CAN interface unit 8 by data lines as to input data directly from the CAN interface unit 8. In FIG. 1, other than data lines, control lines which send and receive control signals are shown. The CPU 2 outputs signals for controlling the abovementioned function sections to the control lines. The control lines are also wired between the DMA controller 7 and the search engine unit 11, and the DMA controller 7, without the control by the CPU 2, reads out data from the search engine unit 11 and transfers the data to forwarding destinations. Here, the configuration having the search engine unit 11, the map memory 13, the sending buffer 14, the receiving control unit 15, the bus interface unit 10 and the CAN interface unit 8 is called a gateway hardware macro section 17.

The gateway hardware macro section 17 is mainly provided with the following functions: first, to take out frame data from a message box of the CAN 9 by using, as a trigger, an interrupt signal generated by the CAN 9 when the frame data is received; second, to route the frame data received; and third, to detect routing errors and other errors. Besides the above, a transmit function of routed data and such may be provided.

The flash ROM 3 stores data or programs used when the CPU 2 runs various processes including a data transmission process. The CPU 2 controls the whole in-vehicle gateway apparatus 1 shown in FIG. 1 and processes the transmission of the frame data routed by the search engine unit 11 by program-control. The CPU 2 performs routing to sort forwarding destinations of the frame data received, based on the programs stored in the flash ROM 3.

The UART 4 is connected with external devices and converts parallel signals sent from the external devices to serial signals, and conversely, converts serial signals sent from serial devices to parallel signals.

The interrupt control unit 6 controls outputs of interrupt signals output from the search engine unit 11 to the CPU 2. When a predefined number of frames are stored in a sending FIFO (a first storage) 21, when the sending FIFO 21 is overflowed, and when a routing error occurred in the search engine unit 11, the search engine unit 11 outputs an interrupt signal to the CPU 2. The DMA controller 7 DMA transfers frame data stored in the sending FIFO 21 routed by the search engine unit 11 without involving the CPU 2.

A plurality of CANs 9 (i.e. CAN_0, CAN_1, CAN_2 and CAN_3) is provided for each communication channel and stores the frame data received from a CAN bus (not shown) and the frame data routed by the search engine unit 11 and by the CPU 2. The routed frame data is read out from the message box and is output to the CAN bus. The CAN 9, when receiving frame data from the communication channel, outputs an interrupt signal to the search engine unit 11.

The search engine unit 11 takes out frame data from the message box of the CAN 9, with the interrupt signal output from the CAN 9 as a trigger, and stores the data to the receiving control unit 15 via the CAN interface unit B. Thereafter, the search engine unit 11 takes out the frame data from the receiving control unit 15 by a predefined timing clock and performs processes such as routing and searching information of relay destinations of data. The search engine unit 11 is also provided with a function to detect an error occurred in the routing process. The details of a routing map stored in the map memory 13 are described later.

The sending buffer 14 stores the frame data routed by the search engine unit 11. The receiving control unit 15 stores the frame data read out from the message box of the CAN 9.

Figure 2:
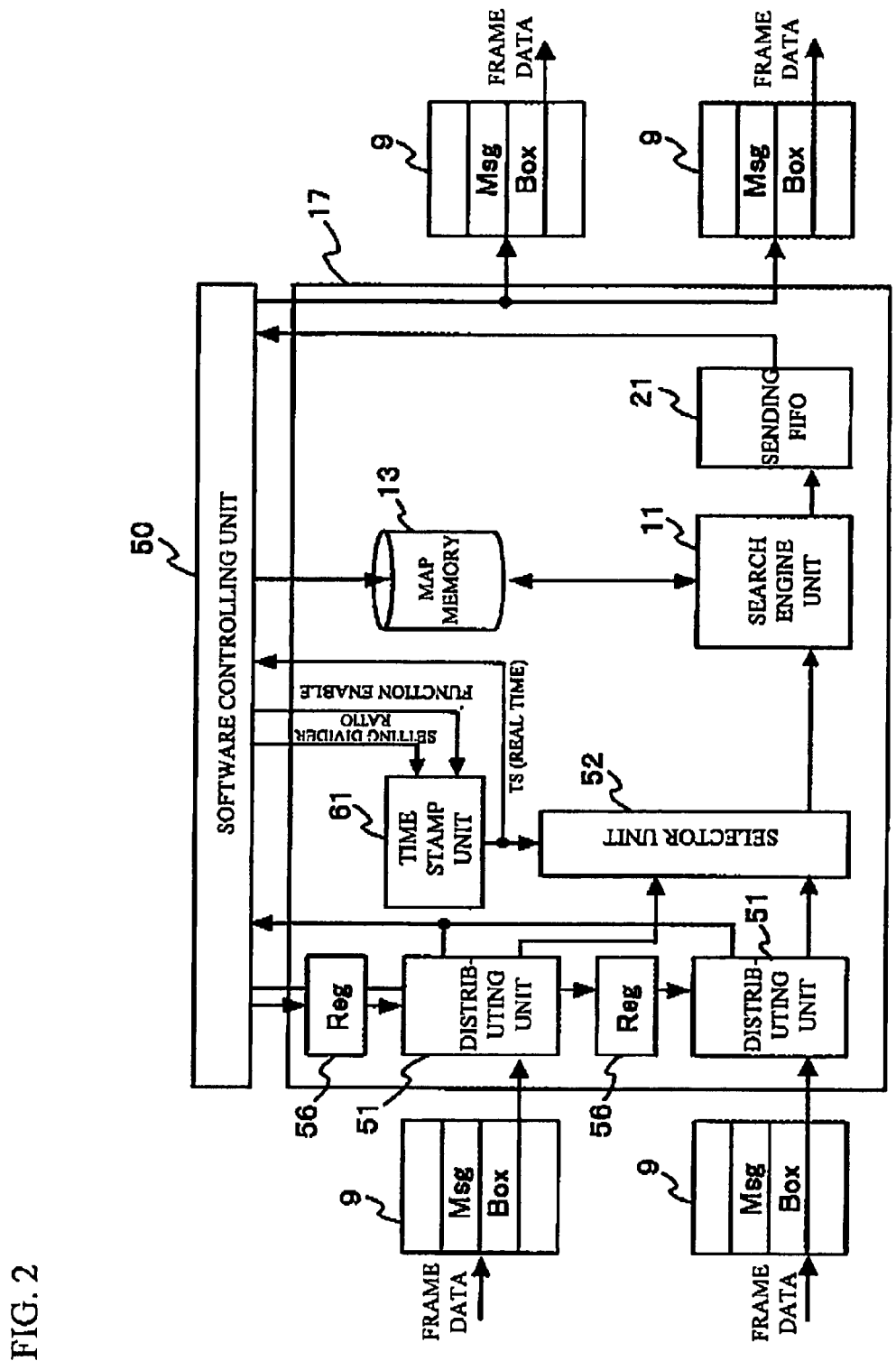
FIG. 2 is an illustration showing a configuration of a gateway hardware macro section.

Next, in reference with FIG. 2, a configuration of the gateway hardware macro section 17 is described. In the in-vehicle gateway apparatus 1 of the second embodiment, the routing of frame data is performed in parallel by a software controlling unit 50 of the CPU 2 and by the gateway hardware macro section 17 provided as hardware.

The gateway hardware macro section 17 has, as shown in FIG. 2, distributing units 51 and registers 56 provided for each communication channel, a selector unit 52, a time stamp unit 61, a search engine unit 11, a map memory 13 and a sending FIFO 21. The abovementioned parity bit summing unit 1300 and checker 1400 are provided between the search engine unit 11 and the map memory 13. Their details are described later.

As shown in FIG. 2, the distributing unit 51, which may be called routing unit, is provided for each communication channel, takes out frame data from a message box 9 of the CAN 9 and performs a sorting process of output destination of the frame data. The distributing unit 51, in reference with destination information set in the frame data, sets the forwarding destination of the frame data to any one of the software controlling unit 50, the selector unit 52 or both the software controlling unit 50 and the selector unit 52. The software controlling unit 50 is a functional section which is enabled by the program-controlled operation of the CPU 2.

Consequently, sorting output destinations of data by the unit of channels and of selected frames allows processes by the software controlling unit 50 and by the hardware in the search engine unit 11 to be preformed in parallel.

As the frame data to be sent to the software controlling unit 50 in priority is transferred without involving the search engine unit 11, the start time of the process in the software controlling unit 50 can be expedited.

The register 56 stores setting information set by the software controlling unit 50. The setting information at least contains operational setting information of an in-vehicle gateway apparatus and setting information for sorting. The distributing unit 51 sorts out frame data according to the setting information stored in the register 56. While only the distributing unit 51 operates referencing with the setting information, the selector unit 52, the search engine unit 11 and the sending FIFO 21 provided at later stages never stop operating and such by the setting information. Consequently, even if the settings of the gateway, communication channels and such are dynamically changed, the problems in that frame data being lost and such in the gateway hardware macro section 17 do not occur.

While a single piece of the search engine unit 11 is provided for a plurality of communication channels, the sending FIFO 21 is provided for each of the communication channels. In order to implement such configuration, the selector unit 52 is provided at the prior stage to the search engine unit 11. The selector unit 52 is fed with frame data from a plurality of communication channels and selects the frame data to output to the search engine unit 11. The selector unit 52 controls the timing of outputting the selected frame data to the search engine unit 11. Even when frame data is output from a plurality of communication channels simultaneously, the selector unit 52 selects the frame data by the order of priority and by the order of arrival, and controls the timing of output to the search engine unit 11. Consequently, the search engine unit 11 can be shared by a plurality of communication channels.

Figure 3:
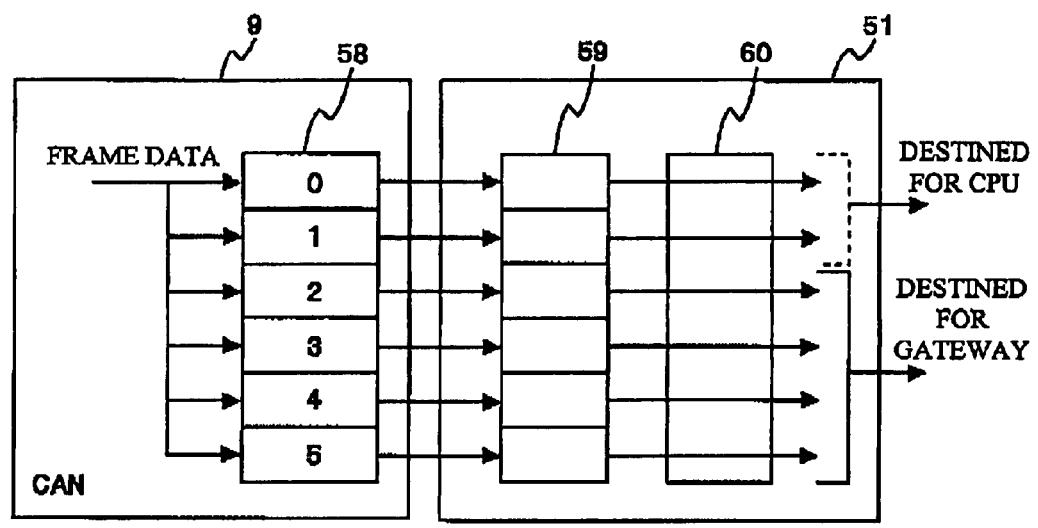
FIG. 3 is a block diagram showing a configuration of a distributing unit.

In reference with FIG. 3, the details of the distributing unit 51 are described. The distributing unit 51 has a first destination distributing unit 59 and a second destination distributing unit 60.

Frame data is sorted by a message distributing unit 58 of the CAN 9 according to an ID of the data and is registered to the message boxes (0, 1, 2, 3, and so on). The first destination distributing unit 59 sets the destination of frame data in the locations sorted by the message distributing unit 58 (i.e. the message boxes 0, 1, 2, 3, and so on) for the software controlling unit 50 or for the search engine unit 11, or sets a multi-destination transmission which sets destinations for both the software controlling unit 50 and the search engine unit 11. Some frame data is discarded here. The second destination distributing unit 60, according to the processing status of the search engine unit 11, forcibly changes the frame data which has been destined for the search engine unit 11 to the software controlling unit 50 or sets frame data to be discarded.

Figure 4:
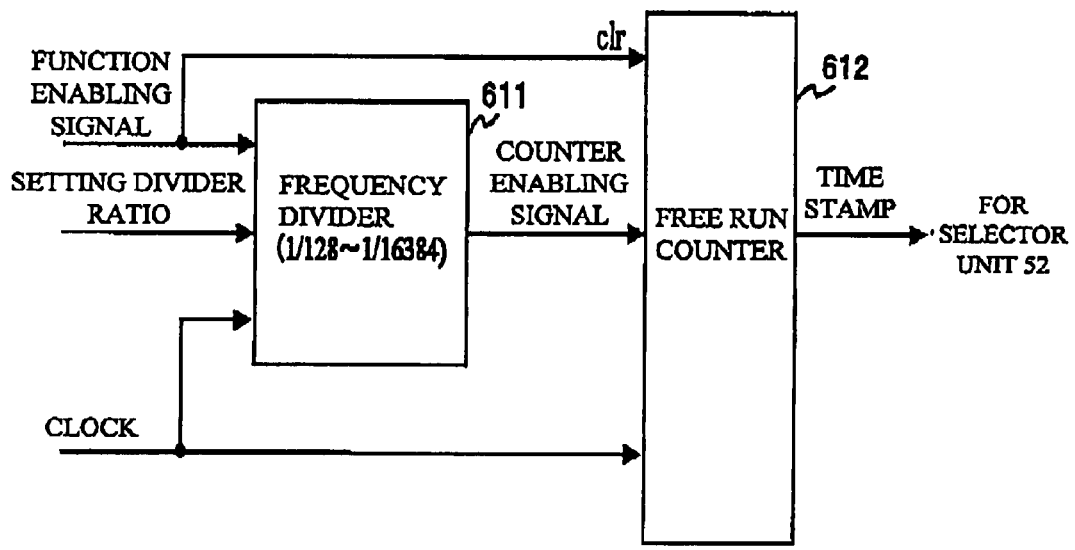
FIG. 4 is a block diagram showing a configuration of a time stamp unit.

In reference with FIG. 4, a configuration of the time stamp unit 61 is described.

The time stamp unit 61 appends time stamps to the frame data input to the selector unit 52. The time stamp unit 61, as shown in FIG. 4, is provided with a frequency divider 611 and a free running counter 612.

The frequency divider 611 is fed with a function enabling signal and a divider ratio setting signal output from the CPU 2, and a clock signal. When the function enabling signal is enabled, the frequency divider 611, outputs a counter enabling signal which is produced based on the frequency divided clock signal according to the setting of the divider ratio setting signal to the free running counter 612.

The free running counter 612 is fed with the clock signal, the counter enabling signal output from the frequency divider 611 and the function enabling signal from the CPU 2. The free running counter 612, when the function enabling signal is enabled, outputs a time stamp by counting the counter enabling signal output from the frequency divider 611.

For example, when the clock frequency is at 16 MHz and the free running counter is a 16-bit counter, with the frequency dividing setting of $1/128$, the minimum measurable time becomes 8 μs and the maximum measurable time becomes 0.524 seconds. When the frequency dividing setting is $1/16384$, the minimum measurable time becomes 1.024 ms and the maximum measurable time becomes 67.1 seconds.

Figure 5:
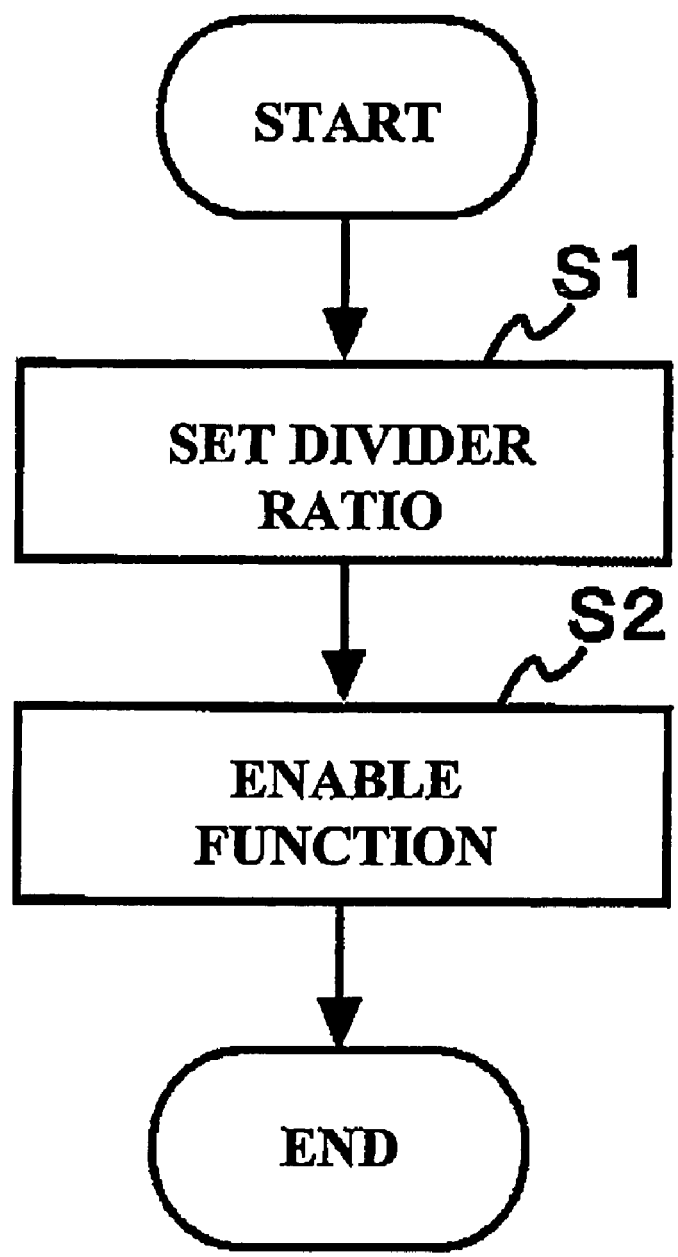
FIG. 5 is a flowchart showing a procedure of an initial setting process of the time stamp unit by a CPU.

In reference with a flowchart shown in FIG. 5, a procedure for the initial setting of the time stamp unit 61 by the CPU 2 is described.

At an initial operation, the CPU 2 sets, for the time stamp unit, the divider ratio according to the range to be measured and resolution (step S1), and thereafter, sets the function enabling signal enable and activates the time stamp unit 61 (step S2).

Figure 6:
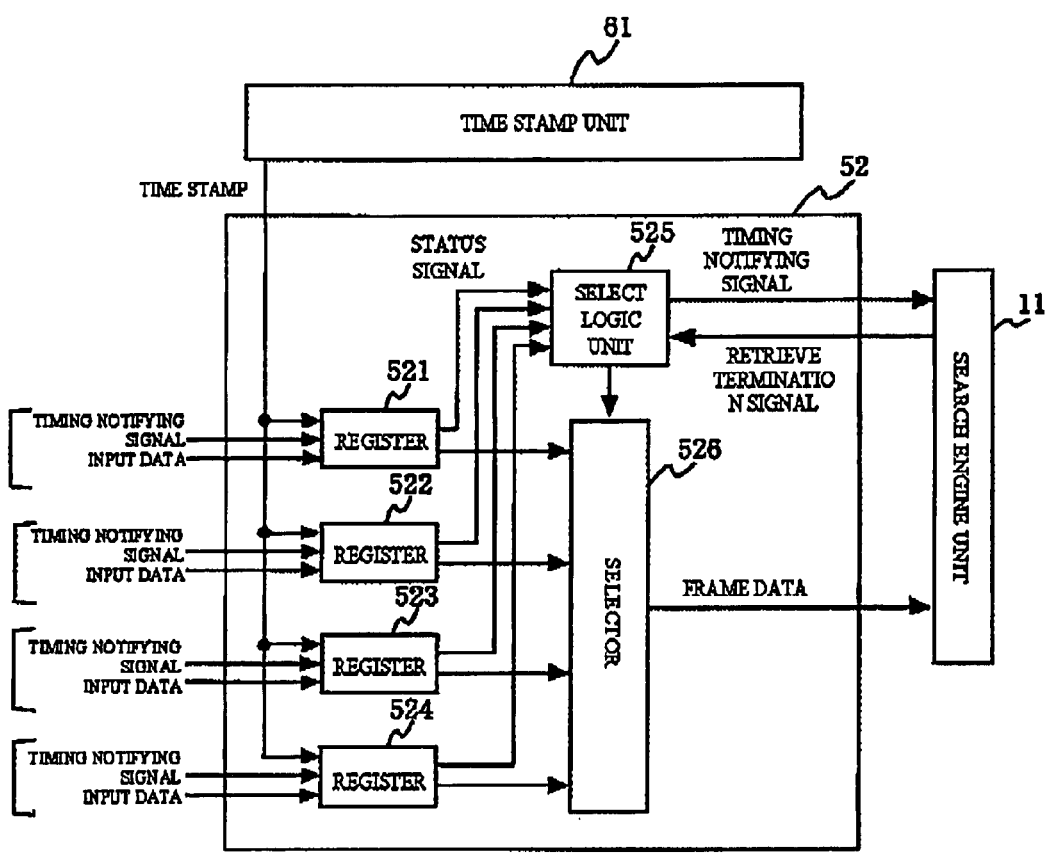
FIG. 6 is a block diagram showing a configuration of a selector.

In reference with FIG. 6, a configuration of the selector unit 52 is described. The selector unit 52 has registers 521, 522, 523 and 524 provided for each communication channel, and a select logic unit 525 and a selector 526.

The registers 521, 522, 523 and 524 are fed with frame data from each channel, timing notifying signals to notify the input timing of frame data to respective registers 521, 522, 523 and 524, and a time stamp issued by the time stamp unit 61. The time stamp issued by the time stamp unit 61 is appended to the frame data in the registers 521, 522, 523 and 524.

The registers 521, 522, 523 and 524 output, to the select logic unit 525, a status signal which indicates whether the valid frame data is held in the registers 521, 522, 523 and 524 or not. The registers 521, 522, 523 and 524 output the frame data, to which the time stamp is appended, to the selector 526 at a predefined timing. The select logic unit 525 outputs, to the selector 526, a select instruction signal that selects the frame data to be output, based on the status signals from the registers 521, 522, 523 and 524. The selector 526 selects the frame data according to the select instruction signal from the select logic unit 525, and thereafter, outputs the frame data to the search engine unit 11 in a subsequent stage.

Figure 7:
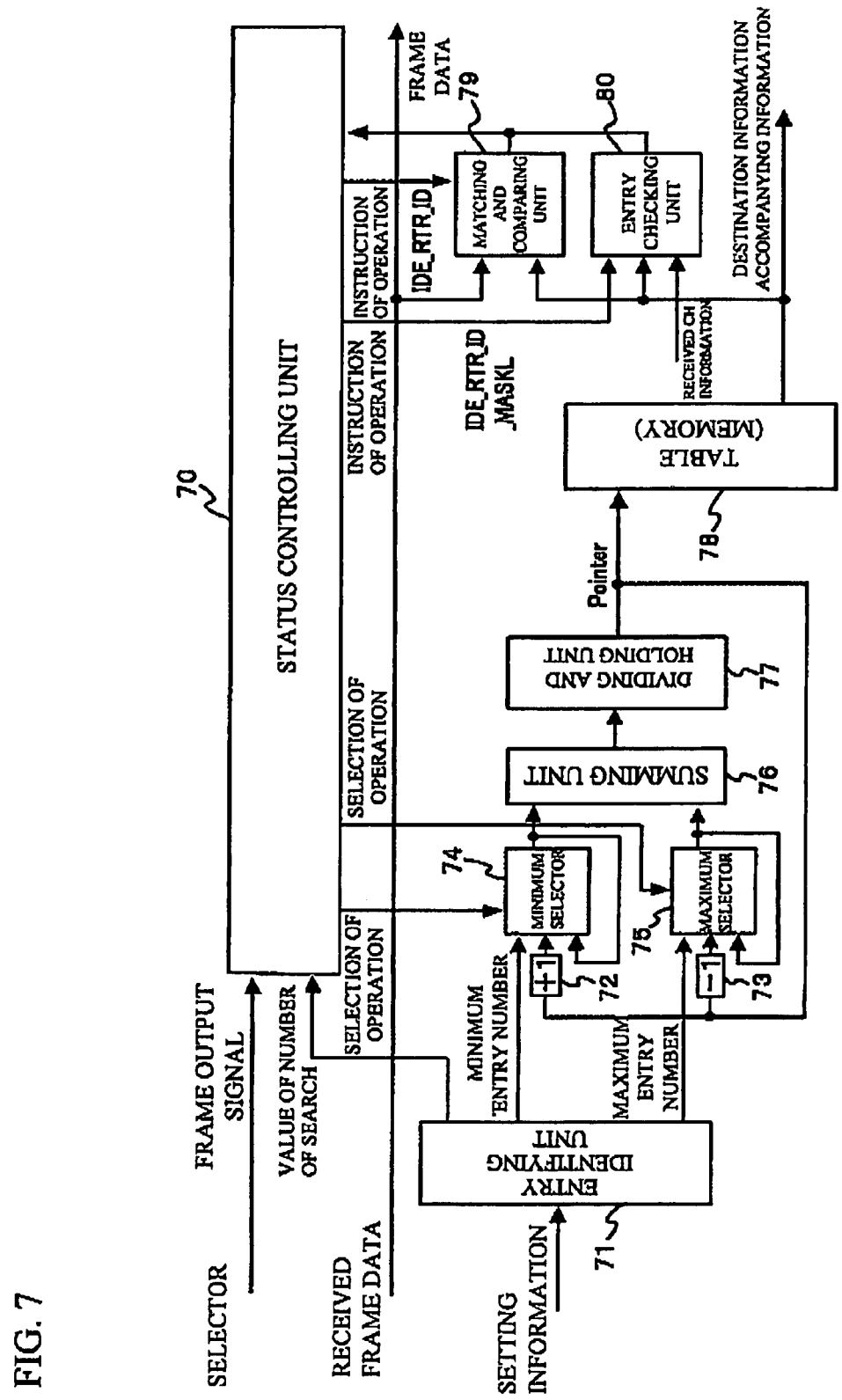
FIG. 7 is a block diagram showing a configuration of a search engine unit.

In reference with FIG. 7, the details of the configuration of the search engine unit 11 are described. The search engine unit 11 is provided with a status controlling unit 70, an entry identifying unit 71, a number summing unit 72, a number subtractor 73, a minimum selector 74, an maximum selector 75, an summing unit 76, a dividing and holding unit 77, a table 78 configured in memory, a matching and comparing unit 79 and an entry checking unit 80.

The status controlling unit 70 is fed with a frame output signal from the selector unit 52 and controls all functional sections shown in FIG. 7. The status controlling unit 70 controls to search the table 78 for the predetermined number of times according to a number of times to search which is input from the entry identifying unit 71.

Figure 8:
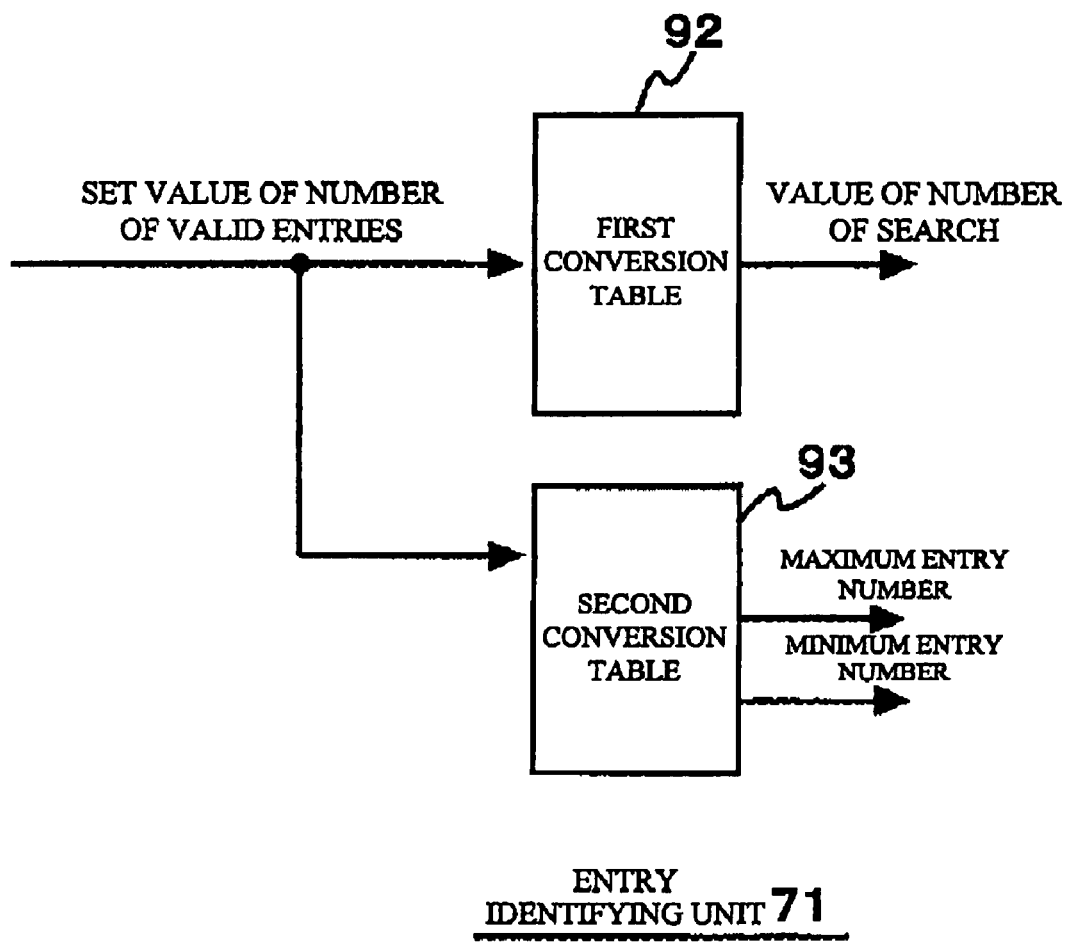
FIG. 8 is a block diagram showing a configuration of an entry identifying unit.

A configuration of the entry identifying unit 71 is shown in FIG. 8. The entry identifying unit 71 has a first conversion table 92 and a second conversion table 93. A set value of a number of valid entries entered to the first conversion table 92 represents the number of entries registered in a routing map which is referenced in destination search.

The first conversion table 92 calculates a value of number of search which sets the number of times to search the memory 78 from the set value of a number of valid entries. For example, when the number of entry for a channel is 256 entries (nodes), as 256 is the eighth power of 2, the number of times to search becomes 9 times by adding a value of +1.

The second conversion table 93 is fed with the set value of a number of valid entries and outputs a maximum entry number and a minimum entry number. The minimum entry number is the least number of ID numbers of the nodes registered (0), and similarly, the maximum entry number represents the greatest number of the ID numbers of the nodes registered (the set value of a number of valid entries). The minimum entry number is output to the minimum selector 74 and the maximum entry number is output to the maximum selector 75. The value of number of search is output to the status controlling unit 70.

The minimum selector 74 is fed with the minimum entry number from the entry identifying unit 71. The minimum selector 74 selects and outputs any one of the aforementioned minimum entry number, the previous entry number, or the entry number derived from the output of the dividing and holding unit 77 with an added value of +1, according to the control of the status controlling unit 70.

Similarly, the maximum selector 75 is fed with the maximum entry number from the entry identifying unit 71. The maximum selector 75 selects and outputs any one of the aforementioned maximum entry number, the previous entry number, or the entry number derived from the output of the dividing and holding unit 77 with an added value of −1, according to the control of the status controlling unit 70.

The summing unit 76 adds the entry number of the minimum selector 74 and the entry number of the maximum selector 75. The dividing and holding unit 77 divides the added value of the summing unit 76 by 2 and holds the result of the division.

Figure 9:
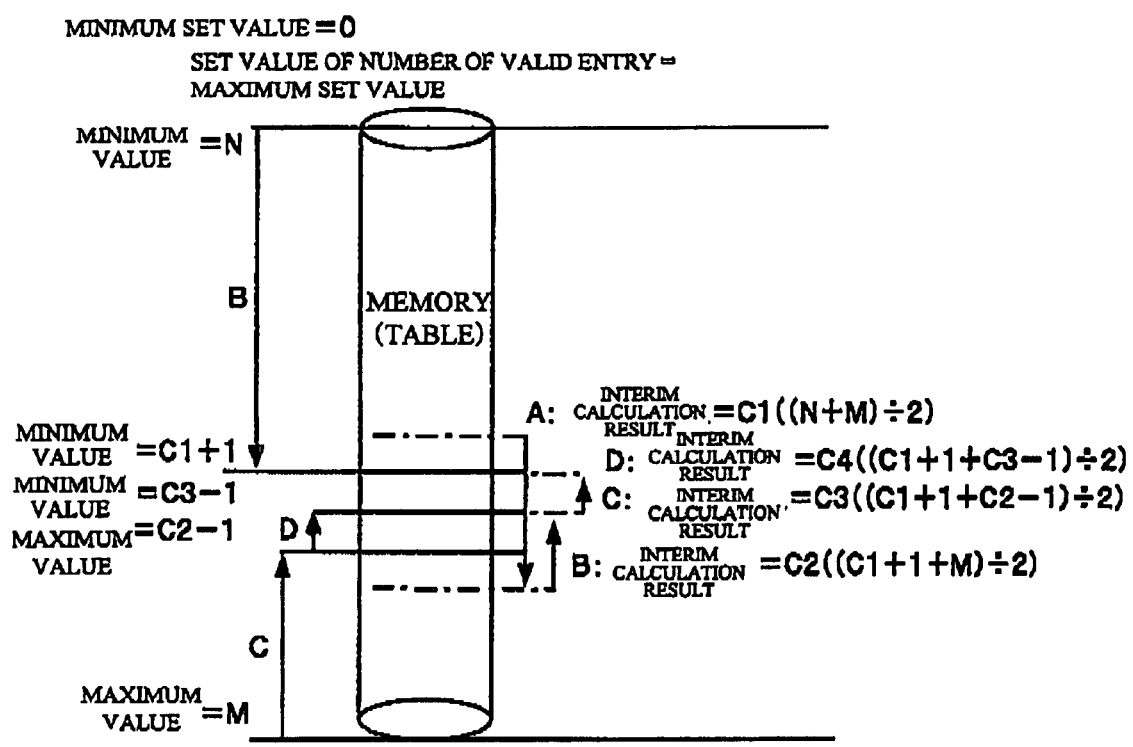
FIG. 9 is an illustration diagram of a binary tree search.

In reference with FIG. 9, a search method of the second embodiment is described. In the second embodiment, a binary tree search is used. FIG. 9 illustrates the concept of a method of the binary tree search. A minimum set value of a memory which the channel subject to search uses is set as N and that of a maximum set value is set as M. To simplify the explanation, the set value of a number of valid entries is set as the maximum set value and the minimum set value is set as the value of 0.

In the binary tree search, an intermediate value between the maximum set value and the minimum set value is calculated first. More specifically, an equation of $(N+M)/2=C1$ is calculated, and the entry data at this address is compared with an ID of the received data. For example, when an ID of received data is smaller than the entry data, this entry data is assumed to be registered at a higher memory address. Consequently, the minimum selector 74 selects the value of the previous value C1 held by the dividing and holding unit 77 with an added value of +1. The maximum selector 75 selects the previous value of M as is. These controls are carried out by the status controlling unit 70. As these values are added by the summing unit 76 and divided by 2 by the dividing and holding unit 77, the equation of (C1+1+M)/2=C2 is calculated. By a large-or-small comparison of the entry data obtained in this way with the received ID, the next address is generated in sequence and the entry data which matches the ID of the received data is searched from the memory 78.

The entry checking unit 80 judges whether the entry data read out from the table 78 is normal data or not. The judged result is output to the status controlling unit 70.

Figure 10:
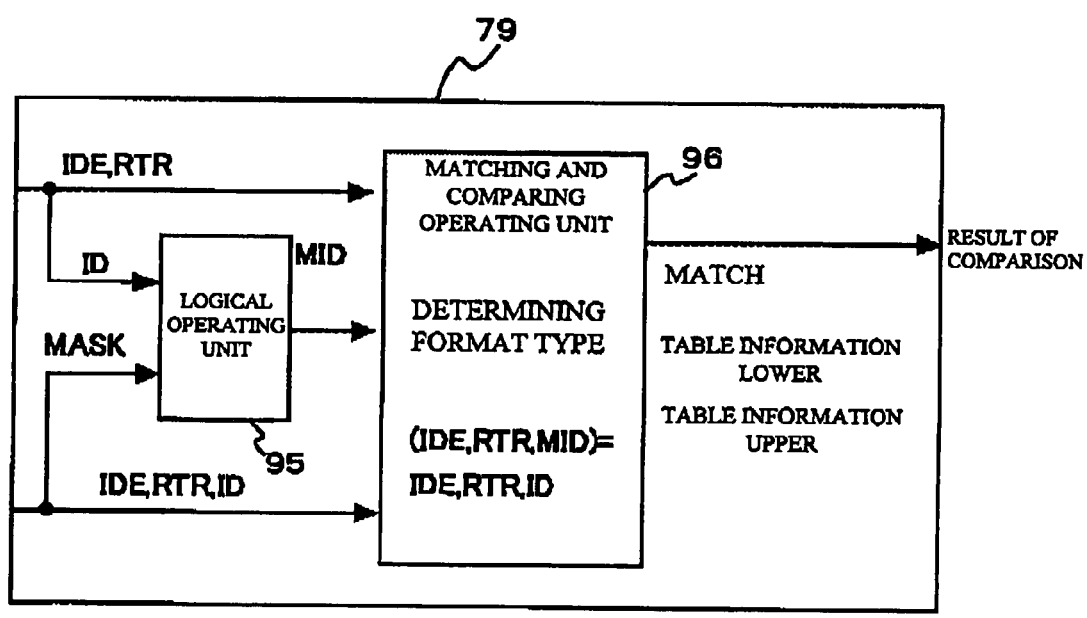
FIG. 10 is a block diagram showing a configuration of a matching and comparing unit.
Figure 11:
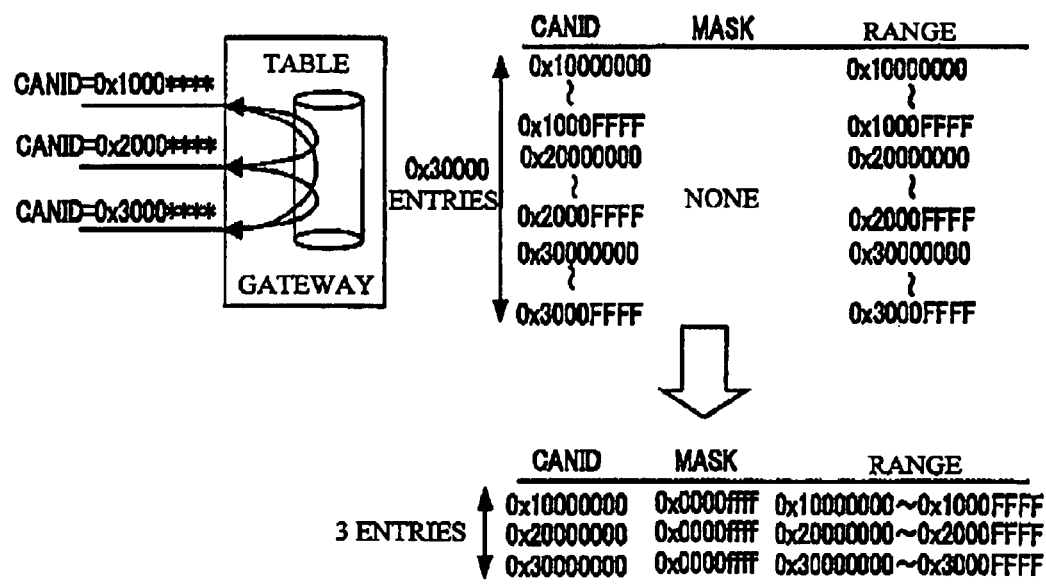
FIG. 11 is an illustration diagram of a masking process.

The matching and comparing unit 79 compares an entry data read out from the table 78 with an ID of received data. In FIG. 10, a configuration of the matching and comparing unit 79 is shown. As shown in FIG. 10, the matching and comparing unit 79 is provided with a logical operating unit 95 and a match comparison operator 96. The logical operating unit 95 refines search ranges by superposing a mask over an ID of received data as shown in FIG. 11. The matching and comparing unit 79 compares the mask superposed ID number with the entry data read out and judges whether the both match or not.

For example, as shown in FIG. 12A, when random ID numbers (the values shown in the drawing represent ID numbers) are given to nodes of four CAN buses A, B, C, and D connected with the gateway apparatus 1, the match of the ID must be detected by the maximum comparisons of 12 times. On the contrary, as shown in FIG. 12B, by setting the same values to a few upper bits for the nodes on the same bus, it is possible to determine which channel the data comes from by comparisons of four times.

Figure 13A:
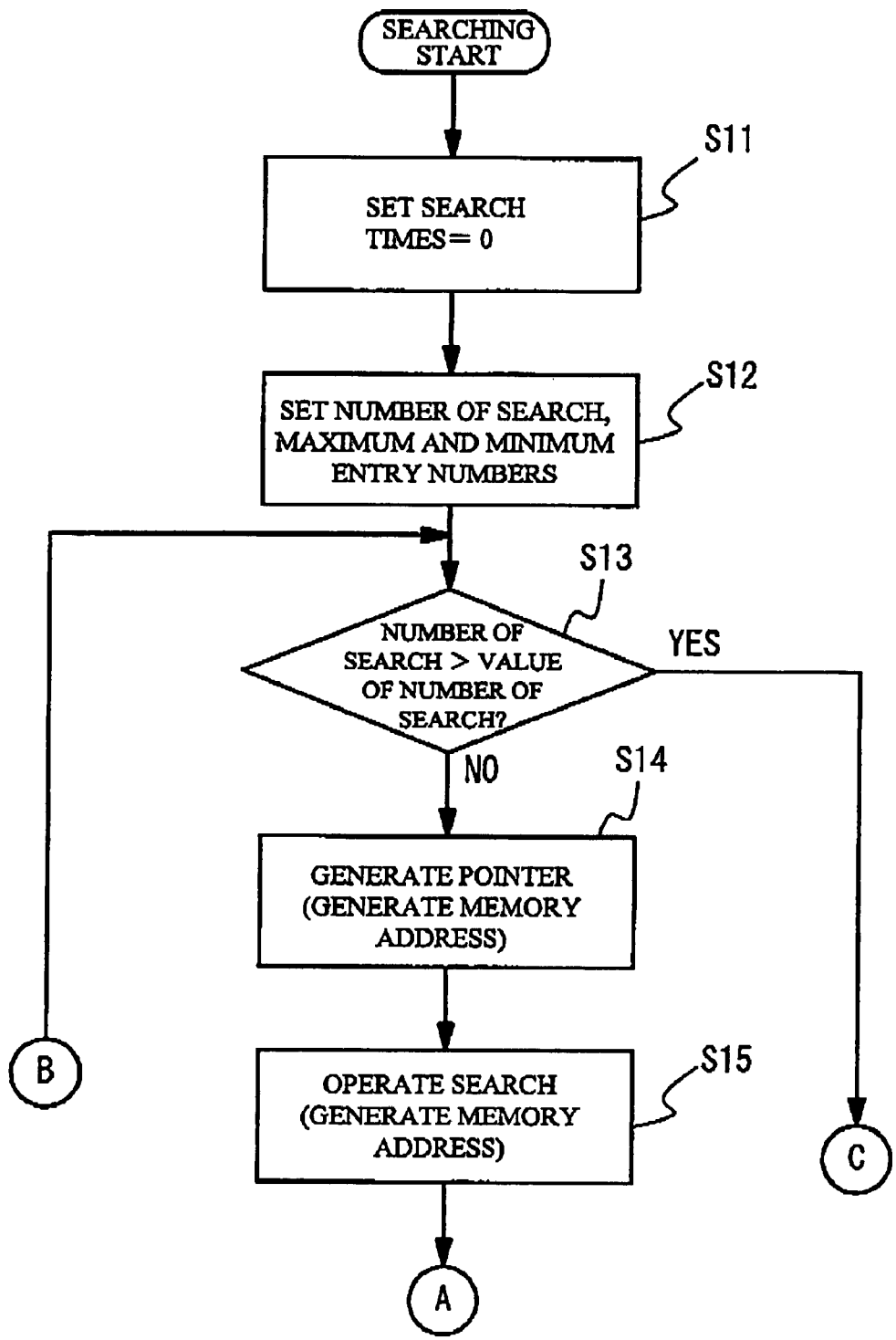
FIGS. 13A and 13B are flowcharts showing a processing procedure of the search engine unit.
Figure 13B:
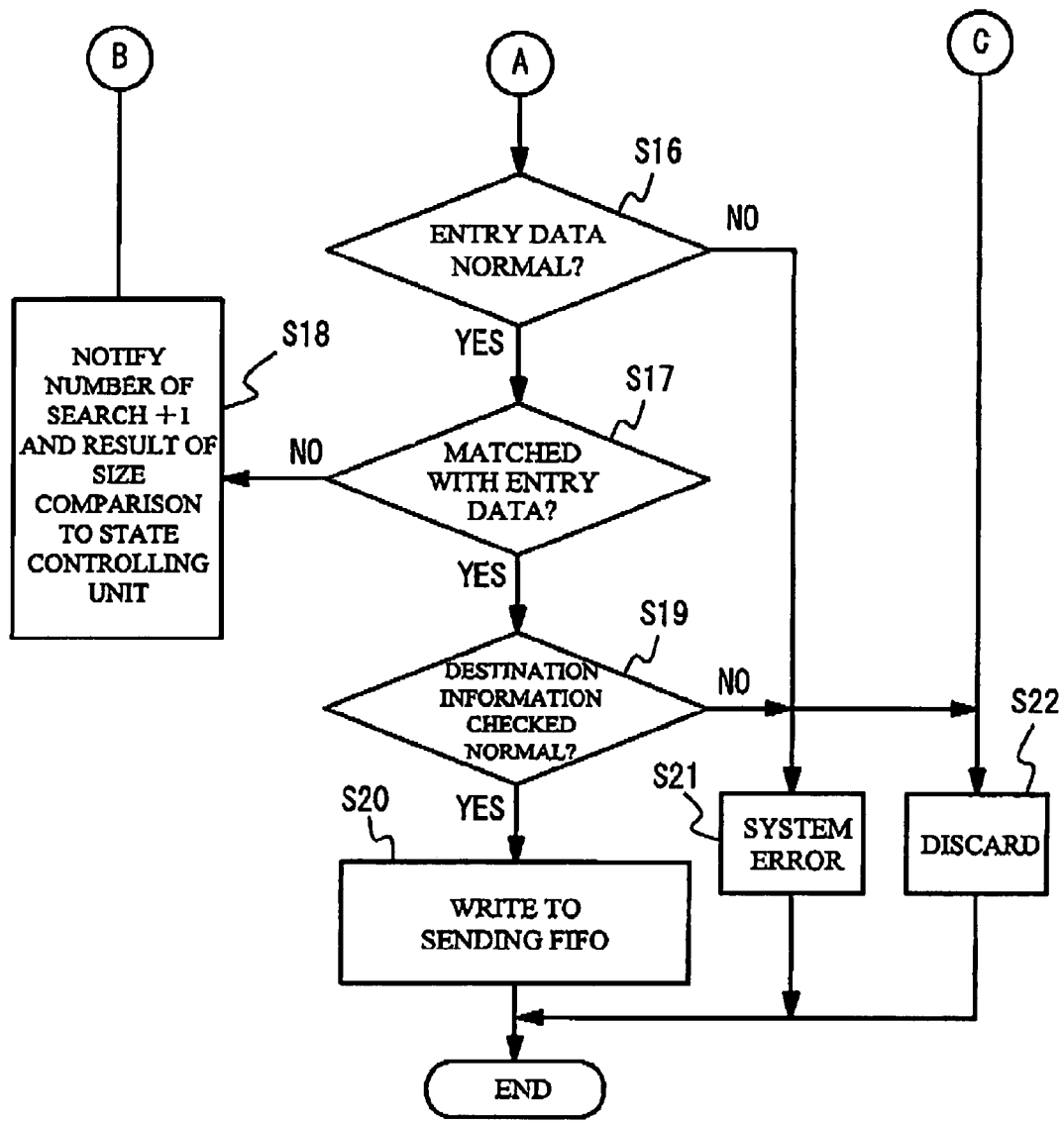

In reference with flowcharts shown in FIGS. 13A and 13B, a processing procedure of the search engine unit 11 is described.

When search is started, the status controlling unit 70 first sets the search time to a value of 0 (step S11). In synchronous with this process, the entry identifying unit 71 sets the value of number of search according to the number of entries (step S12). The value of number of search is notified from the entry identifying unit 71 to the status controlling unit 70.

The status controlling unit 70 compares the number of search times with the value of number of search notified from the entry identifying unit 71 (step S13), and when the number of search times is less than the value of number of search (step S13; YES), based on an initial value or the information of a previous large-or-small comparison, a pointer address of a memory is generated (step S14). The minimum selector 74 is fed with a minimum entry number from the entry identifying unit 71. Similarly, the maximum selector 75 is fed with an maximum entry number from the entry identifying unit 71. The summing unit 76 adds the minimum entry number and the maximum entry number. The dividing and holding unit 77 divides the added value by 2 and holds the result. The result value becomes an address of the pointer.

When an address of the pointer is generated, the entry data represented by the pointer address is read out from the memory 78 (step S15). The read out entry data is fed to the entry checking unit 80 and is judged whether the data is normal or not (step S16). When the value is not normal (step S16; NO), it is processed as a system error. When the entry data is normal (step S16; YES), whether the ID of the received data matches with the entry data or not is judged by the matching and comparing unit 79 (step S17). In case the both do not match (step S17; NO), the number of search times is incremented and the result of the large-or-small comparison in the matching and comparing unit 79 is output to the status controlling unit 70 (step S18), and steps in and following the step S13 are repeated. The status controlling unit 70, according to the result of the large-or-small comparison, controls the minimum selector 74 and the maximum selector 75, and the pointer address corresponding to the result of the previous comparison is generated. Meanwhile, when the both match (step S17; YES), the destination information of the matched entry data is checked (step S19), and when normal, is written to the sending FIFO 21 (step S20). In case the destination information is not normal (step S19; NO), either it is processed as a system error (step S21) or the frame data is discarded (step S22). Further, the status controlling unit 70, when the number of search times becomes greater than the value of number of search (step S13; YES), discards the frame data received (step S22).

Figure 14A:
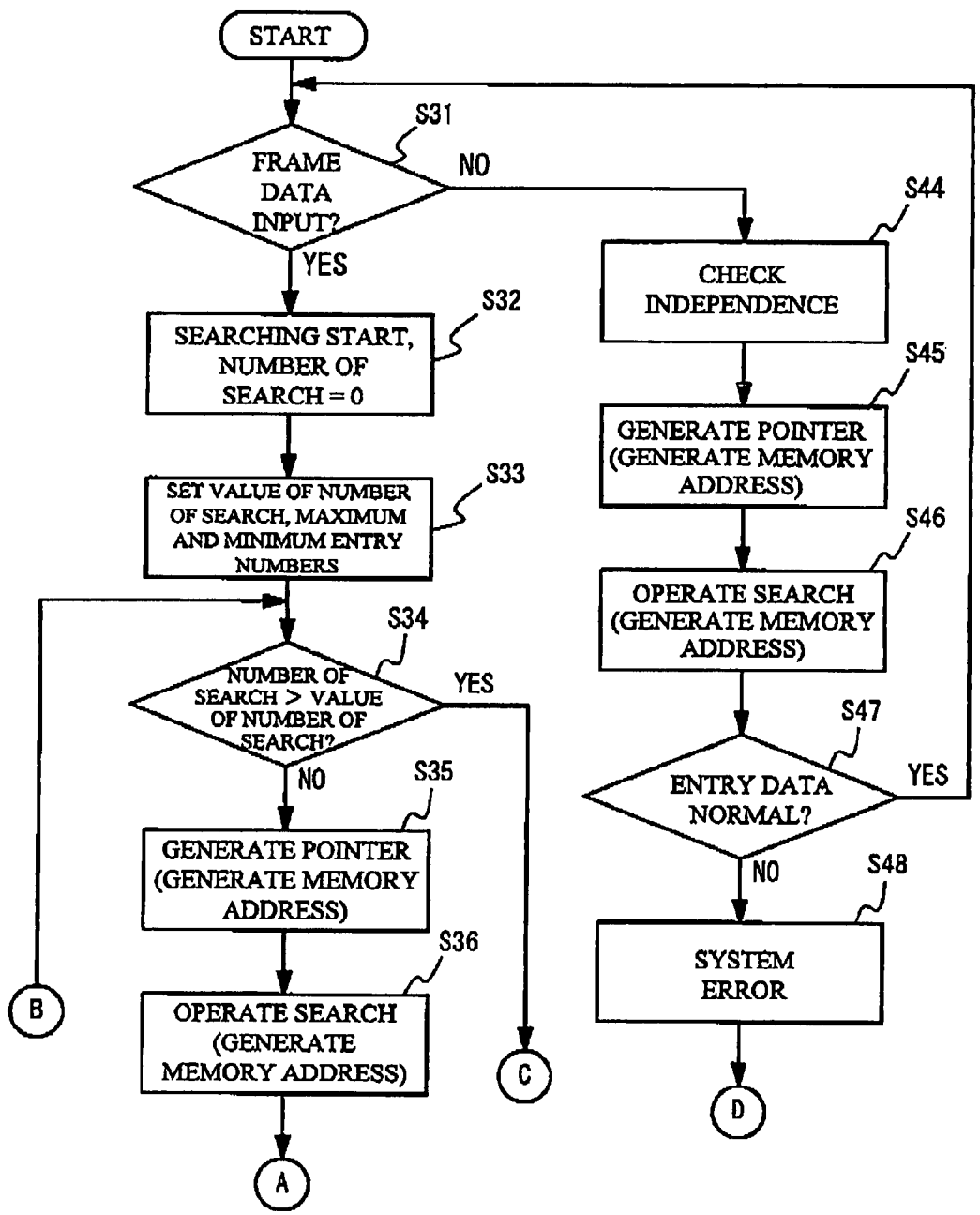
FIGS. 14A and 14B are flowcharts showing a processing procedure particularly of a self-checking process of the search engine unit.
Figure 14B:
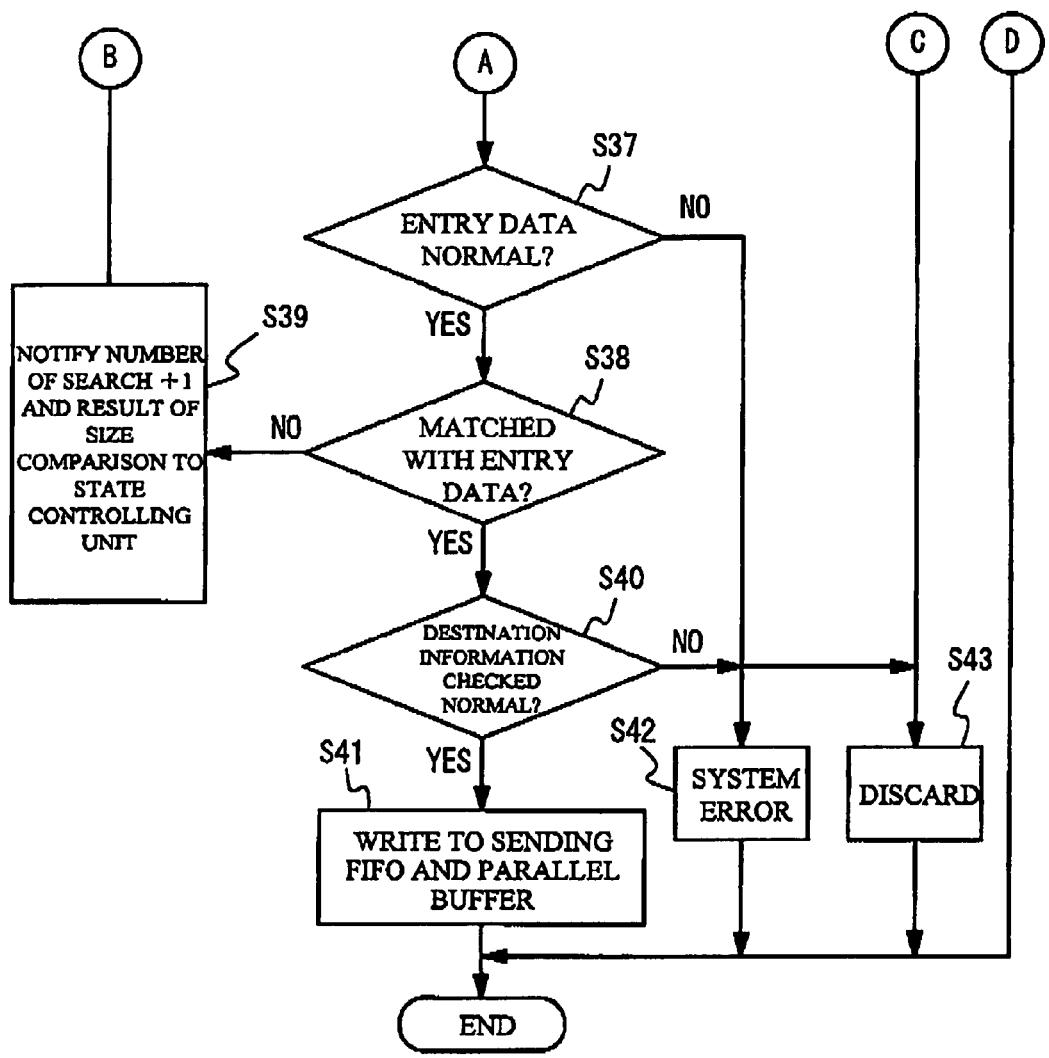

The status controlling unit 70, while being in an idle state not receiving any frame data, may conduct a normality confirmation operation for map information. This process is described in reference with flowcharts shown in FIGS. 14A and 14B.

The status controlling unit 70, while being in the idle state not receiving any frame data (step S31), conducts a self-check (step S44). The status controlling unit 70 generates a pointer address (step S45) first, and searches the entry data stored in the corresponding address and takes out the data (step S46). Thereafter, the normality of entry data taken out is judged (step S47). When the searched entry data is judged as normal (step S47; YES), the process is finished. When an error is detected (step S47; NO), it is processed as a system error (step S48).

Figure 15:
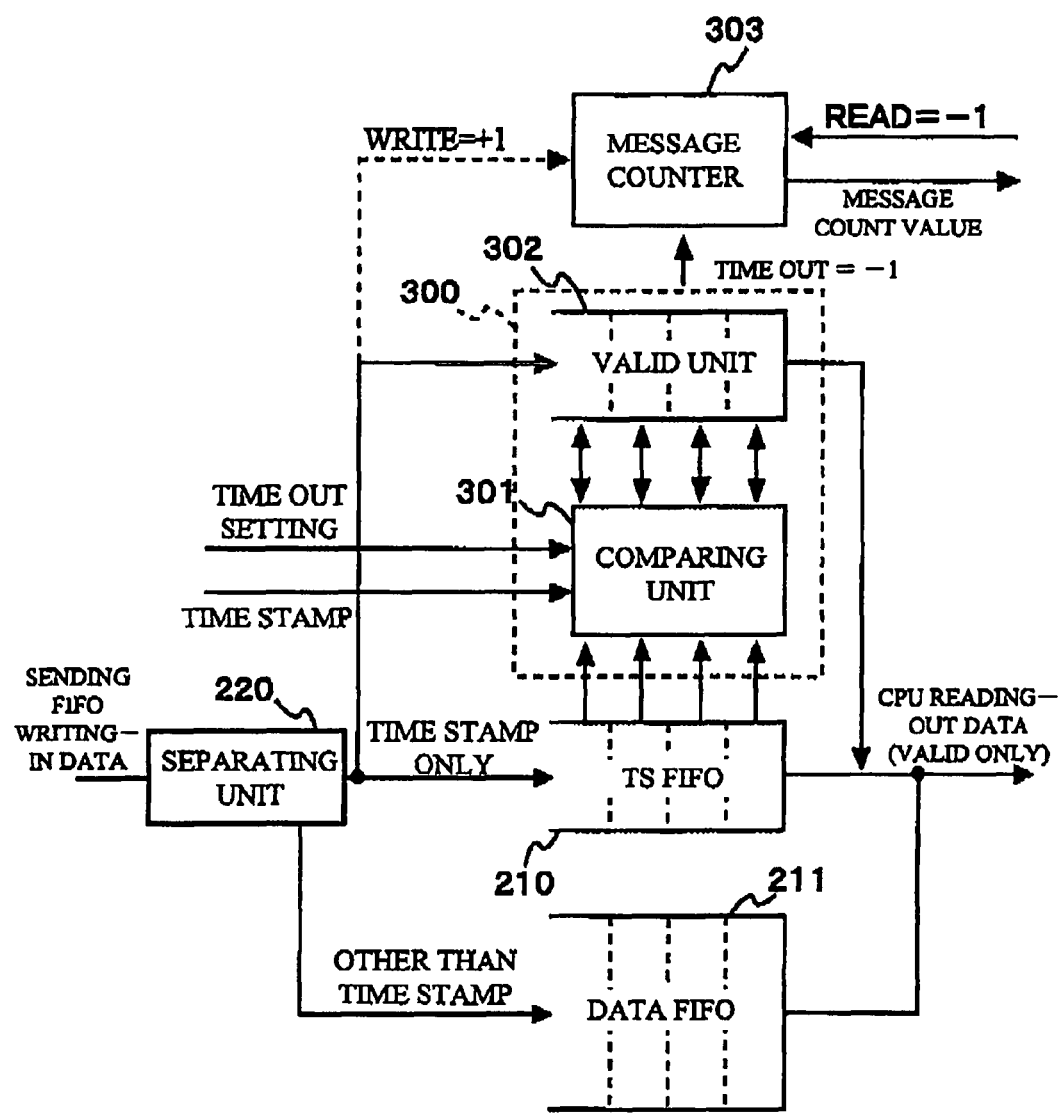
FIG. 15 is a block diagram showing configurations of a sending FIFO and a data discarder that discards invalid frame data.

FIG. 15 shows a configuration of the sending FIFO 21 and that of discarding frame data according to a delay time in the process of frame data.

As shown in FIG. 15, the sending FIFO 21 is provided with a time stamp FIFO 210 which stores a time stamp and a data FIFO 211 which stores frame data. A data discarder 300 that discards data according to a delay time in process is provided with a comparing unit 301 and a valid unit 302.

The time stamp added frame data output from the search engine unit 11 is separated to a time stamp and an area other than the time stamp by a separating unit 220, and are respectively held in the time stamp FIFO 210 (hereinafter abbreviated also as TS FIFO) and the data FIFO 211. The separating unit 220 takes out the time stamp inserted at a predefined location of frame data and outputs to the TS FIFO 210.

The valid unit 302 stores validation data, where a value of 1 is stored for the valid data, which represents the data held in the time stamp FIFO 210 and in the data FIFO 211 valid.

The comparing unit 301 is fed with a time stamp and timeout setting information. The time stamp is the information representing the current time issued by the time stamp unit 61. The timeout setting information is the information set by the CPU 2 and is the setting of a permissible delay time to take for frame data entered in the gateway hardware macro section 17 to be output from the gateway hardware macro section 17.

The valid unit 302, the time stamp FIFO 210 and the data FIFO 211 are respectively configured with a FIFO of the same configuration.

Therefore, the time stamp information of the frame data written to the data FIFO 211 is written to the same area of the time stamp FIFO 210. Similarly, the validation data that represents whether the frame data being valid data or invalid data is written to the same area of the valid unit 302.

The comparing unit 301 reads out the time stamp in the area where the data representing being valid is stored in the valid unit 302 from the TS FIFO 210, and compares that with the time stamp information representing the current time output from the time stamp unit 61. When the difference between the time in the time stamp stored in the TS FIFO 210 and the current time exceeds the timeout setting information notified from the CPU 2, the comparing unit 301 changes validation data in the valid unit 302 to that of invalid data, i.e. stores a value of 0. When the validation data is changed to that of invalid data, the value in a message counter 303 is subtracted by a value of 1.

The CPU 2 reads out the value of the message counter 303 at a predefined timing. When the value of the message counter 303 becomes a predefined value, the CPU 2 reads out the frame data from the data FIFO 211. In this case, the frame data for which the data representing being invalid is stored in the valid unit 302 is discarded without being read out.

Figure 16:
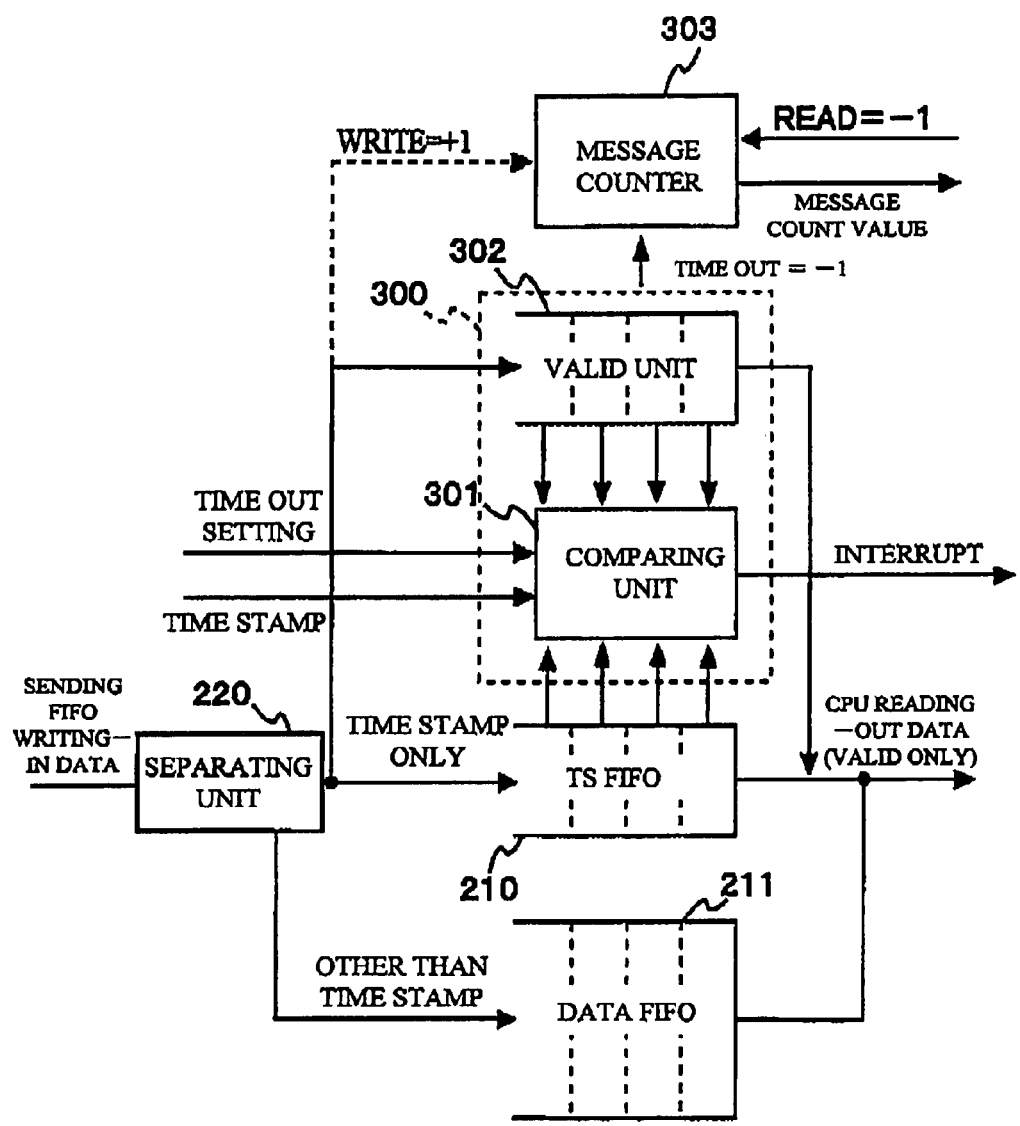
FIG. 16 is a block diagram showing another configurations of the sending FIFO and the data discarder that discards invalid frame data.

When the difference between the time in the time stamp stored in the TS FIFO 210 and the current time exceeds the timeout setting information notified from the CPU 2, the comparing unit 301 may be configured to output an interrupt signal to the CPU 2. This configuration is shown in FIG. 16. When the CPU 2 is fed with the interrupt signal, it reads out the frame data stored in the data FIFO 211 in priority.

In FIGS. 15 and 16, the configurations of discarding the frame data whose dwell time in the gateway hardware macro section 17 exceeded the timeout time by hardware are shown. However, other than those, by the software control of the CPU 2, the frame data whose dwell time exceeded the timeout time may be discarded by software.

Figure 17:
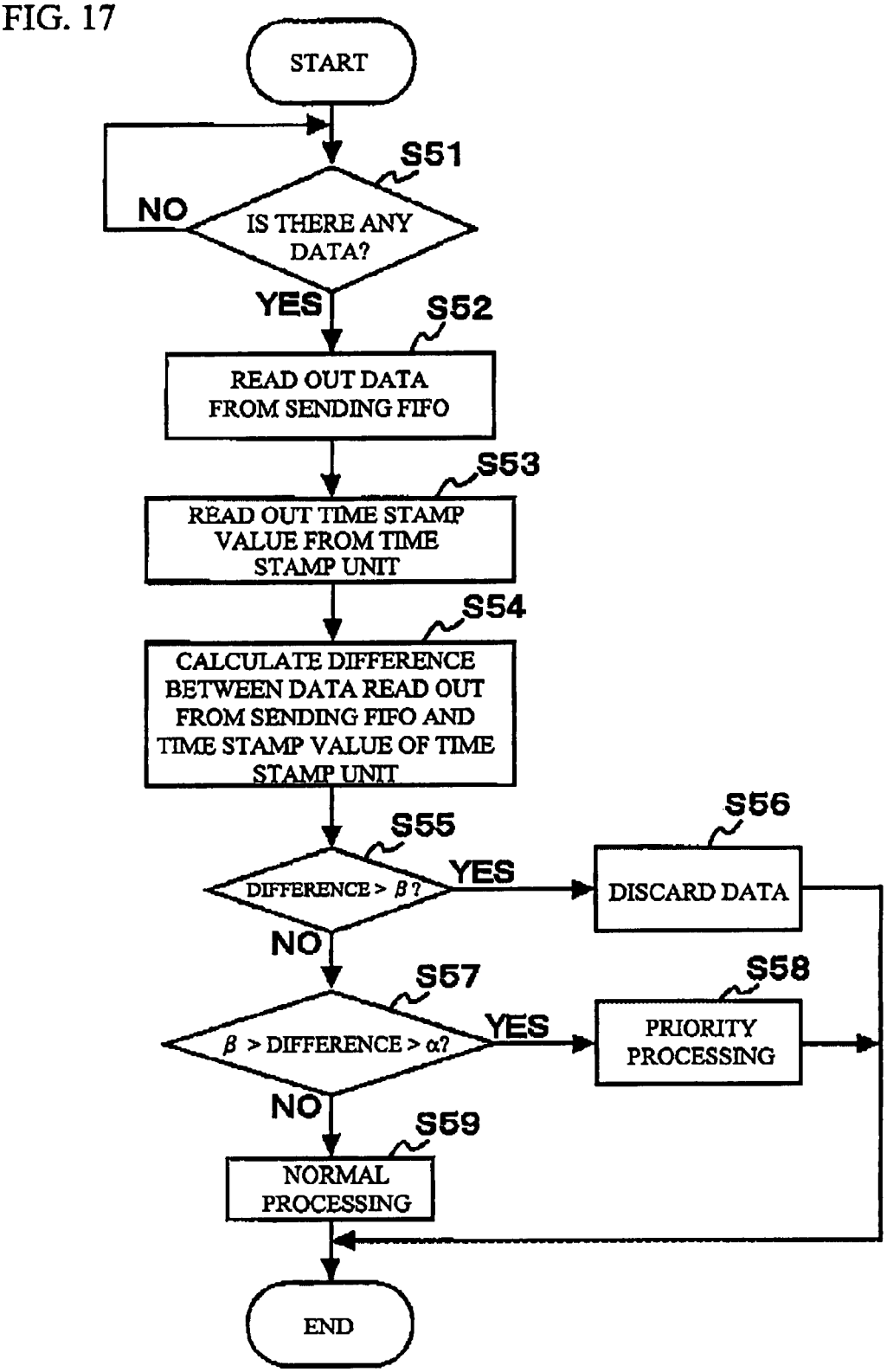
FIG. 17 is a flowchart showing a procedure of discarding invalid frame data process by the CPU.

In reference with a flowchart shown in FIG. 17, a procedure of discarding the frame data whose dwell time exceeded the timeout time by the CPU 2 is described.

The CPU 2 references with the message counter 303 at a predefined time interval and judges whether processing data is stored in the sending FIFO 21 (step S51). When processing data is stored in the sending FIFO 21 (step S51; YES), the CPU 2 reads out the processing data from the sending FIFO 21 (step S52) and reads out the time stamp information representing the current time from the time stamp unit 61 (step S53).

The CPU 2 compares the time stamp information appended to the frame data read out from the sending FIFO 21 with the current time information read out from the time stamp unit 61 (step S54).

When the difference between the time in the time stamp and the current time is greater than a first criterion value $\beta$ (step S55; YES), the frame data is discarded (step S56). When the difference between the time in the time stamp and the current time is smaller than the first criterion value $\beta$ and is greater than a second criterion value $\alpha$ (step S57; YES), the CPU 2 judges that the process of the frame data is delayed and processes the frame data in priority (step S58). The first criterion value $\beta$ is set as a greater value than that of the second criterion value $\alpha$.

When the difference between the time in the time stamp and the current time is smaller than the second criterion value $\alpha$ (step S57; NO), the CPU 2 judges that the process of the frame data is not delayed and processes normally (step S59).

In FIGS. 18A through 18D, configurations of the frame data transferred in the gateway hardware macro section 17 are shown. FIG. 18A shows the configuration of the frame data input to the selector unit 52. FIG. 18B shows the configuration of the frame data with a time stamp appended output from the selector unit 52 to the search engine unit 11. FIG. 18C shows the configuration of the frame data with the time stamp appended written to the sending FIFO 21. FIG. 18D shows the configuration of the frame data which the CPU 2 reads out from the sending FIFO 21. The asterisk mark shown in FIGS. 18B through 18D represents being composed of a plurality of bits.

Figure 19:
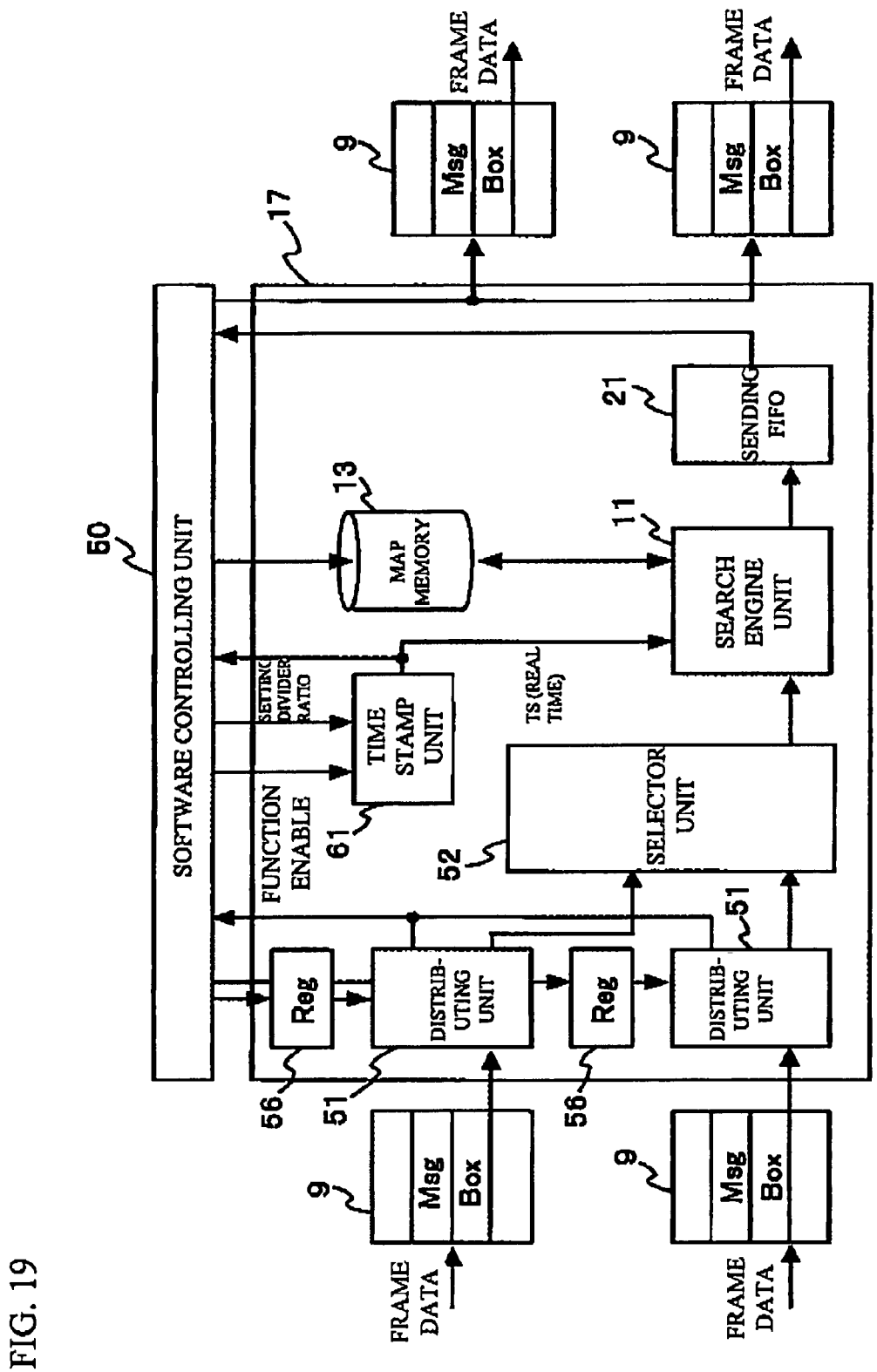
FIG. 19 is an illustration showing another configuration of the gateway hardware macro section.

The time stamp information appended to frame data may be appended only to the data judged as valid frame data by the search engine unit 11. FIG. 19 shows the configuration in that case. In view of measuring a dwell time in the gateway hardware macro section 17, while the configuration in FIG. 2 measures the strict dwell time, the configuration shown in FIG. 19 allows the scale of hardware to be small.

While discarding frame data is mainly performed by discarding by software, when discarding by hardware, the configuration becomes as shown in the drawing in FIG. 16.

Second Embodiment

Referring to the attached drawings, a second preferred embodiment of the present invention will be described.

Figure 20:
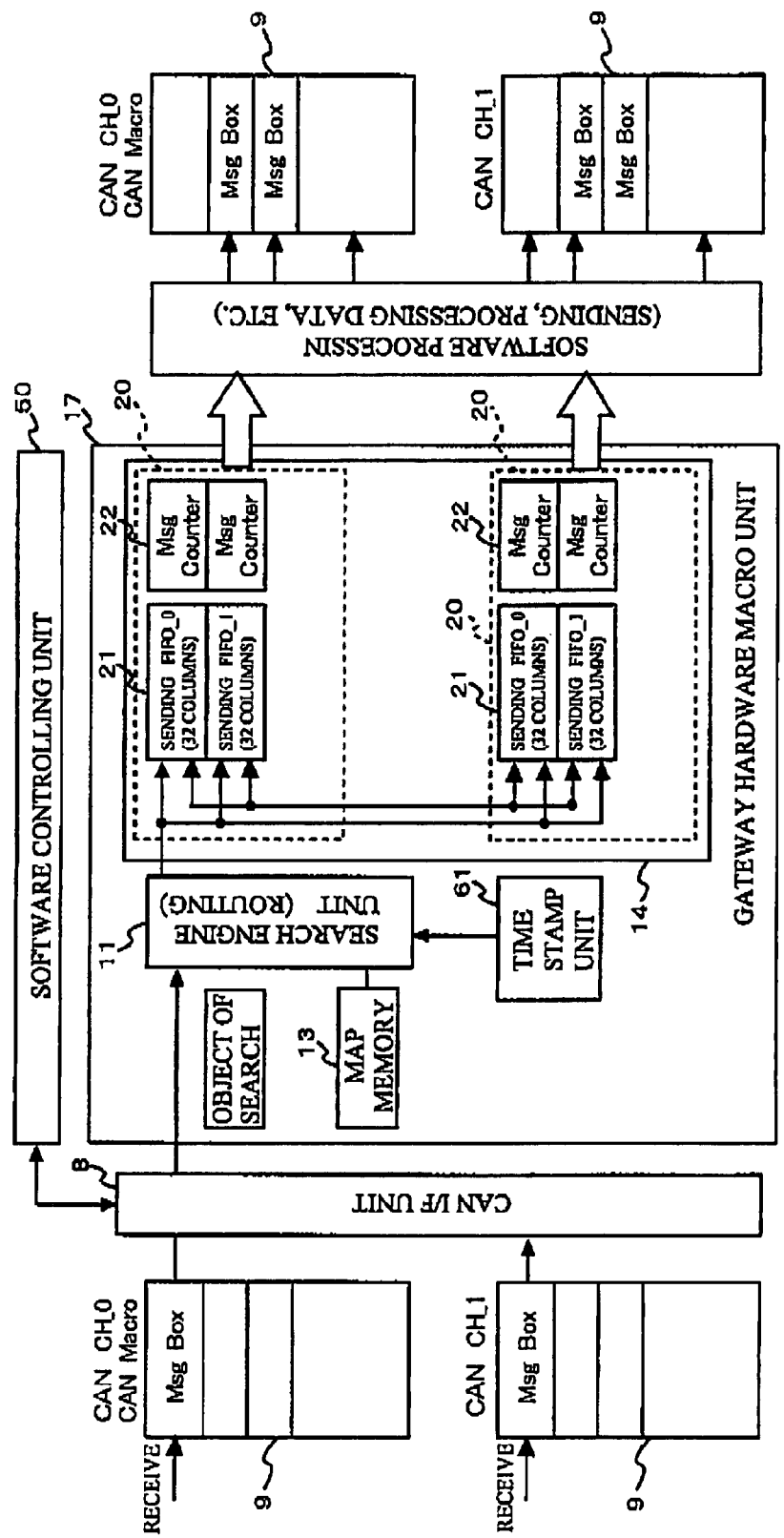
FIG. 20 illustrates the configuration indicative of a gateway hardware macro section.

FIG. 20 shows a construction of the gateway hardware macro section 17 of a second example. The gateway hardware macro section 17 is, as shown in FIG. 20, provided with the search engine unit 11 and a sending FIFO unit 20 as main elements. The sending FIFO unit 20 is provided with the sending FIFO 21, a message counter 22, and the like. The sending FIFO unit 20 is provided within the sending buffer 14. As shown in FIG. 20, one search engine unit 11 is provided for a plurality of receiving channels. Each of the sending FIFO 21 and the message counter 22 is provided on the basis of two for each channel. In the present embodiment, each sending FIFO 21 is used separately according to a function such as dedicated for normal sending or for priority sending.

Frame data retrieved from a message box of the CAN 9 is stored temporarily in the receiving control unit 15. The search engine unit 11 thereafter reads out frame data from the receiving control unit 15 at a predetermined interval, performs routing thereof, and stores the data after routing in the sending FIFO 21. It should be noted that, as shown in FIG. 20, at least one message box is prepared for receiving in each CAN 9 and the other message boxes may be used freely.

It should be noted that the time stamp unit 61 is provided also in the present embodiment, which adds a time stamp to frame data input to the search engine unit 11.

The configuration of the time stamp unit 61 is the same as that shown in FIG. 4, and therefore the time stamp unit 61 operates according to a function enabling signal output from the CPU 2, a divider ratio setting signal, and a clock signal.

Figure 21:
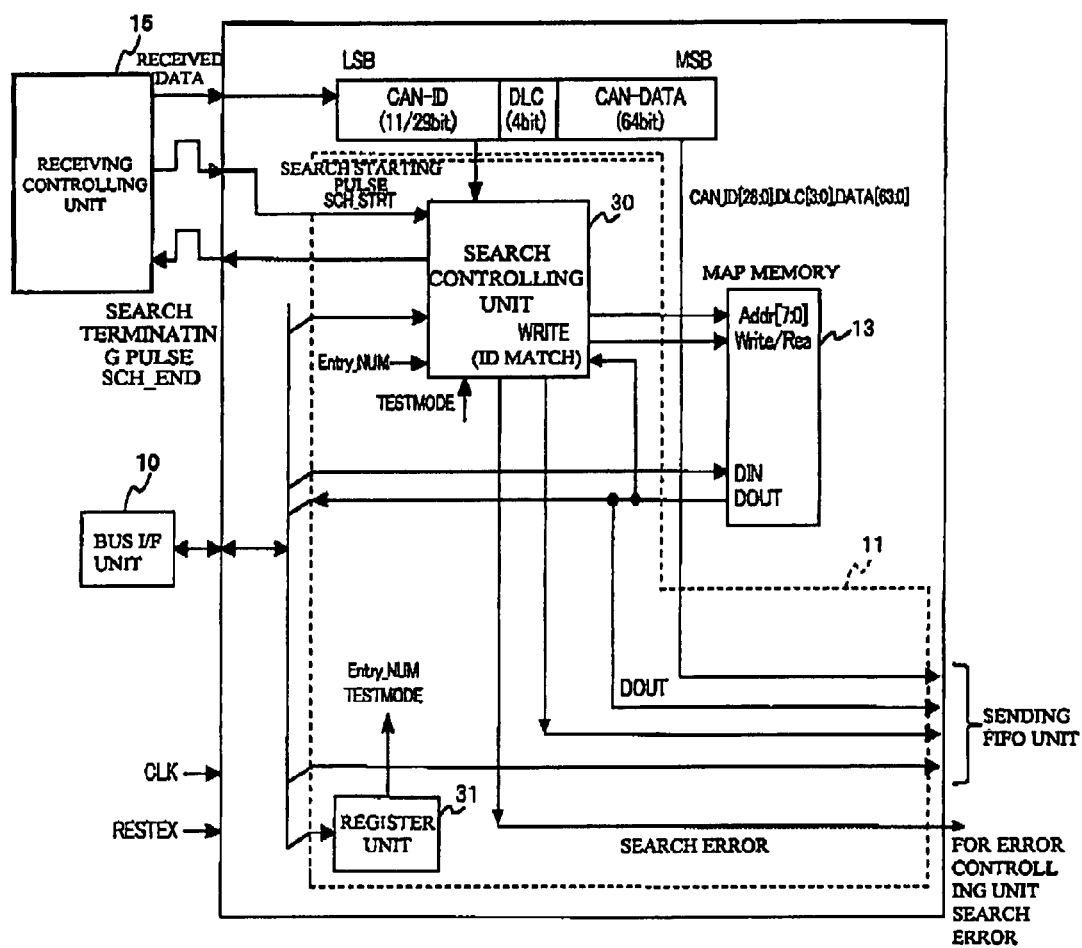
FIG. 21 illustrates the configuration of a search engine unit.

Next, referring to FIG. 21, the construction of the search engine unit 11 will be described in detail. The search engine unit 11 is, as shown in FIG. 21, provided with a search controlling unit 30 and a registering unit 31.

The search controlling unit 30 is a functioning unit for performing routing for frame data. Frame data stored in the receiving control unit 15 is retrieved at a predetermined interval, and then routing is performed therefor. FIG. 21 shows data which is taken in the search controlling unit 30. CAN_ID, DLC, and CAN-DATA are taken in the search controlling unit 30. In the map memory 13, a routing map for the search controlling unit 30 to perform routing is recorded. A routing map is defined for each channel through which data is transferred, and information is defined by which data received at each channel is transferred to at least one different channel. FIG. 22 shows an example of a routing map. As shown in FIG. 22, for each entry, data labels are recorded as information of an address of a memory to which information is recorded, the IDE indicative of the format type, the RTR indicative of the frame type, the ID, the mask information, the information indicative of the channel, the sending FIFO number, the sending channel number, the receiving channel number, and the data label as another information.

In the registering unit 31, setting information of the search controlling unit 30 set by the CPU 2 is recorded. For example, recorded are information such as for commanding to halt, start, or reset a function of the search controlling unit 30, for setting a function of the search controlling unit 30 to be enabled or disabled for each channel, for defining various errors shown in table 1, and for setting, when a routing error or an overflow of the sending FIFO 21 occurs, whether a generating factor thereof should be notified to the CPU 2 or not. It should be noted that an overflow of the sending FIFO 21 refers to a status where, in a status there is no space area left at the sending FIFO 21, a new data is written to the sending FIFO and therefore the latest data overwrites the oldest field of the FIFO. It should also be noted that a routing error refers to an error shown at A in Table 1, or a status where all the information of destination of the channels described in a map memory is zero, or all the information of the receivable channels is zero.

TABLE 1

| Error category | Status | Gateway controlling unit (Corresponding operation) | Notification to CPU |
|---|---|---|---|
| A | Destination channel unidentified (all zero bits) | Discards frame | YES |
|   | Receiving channel unidentified (all zero bits) | Discards frame | YES |
| B | Destination channel not applicable | Discards frame | NO |
| C | Destination channel matched with receiving channel (by setting) | Discards frame | NO |
| D | Map memory parity error | Discards frame | YES |
| E | Destination channel specifying "disable" channel | No response | NO |
| F | ID and mask information identification with redundant bits | No response | NO |
| G | Bus OFF | No response | NO |

Figure 23:
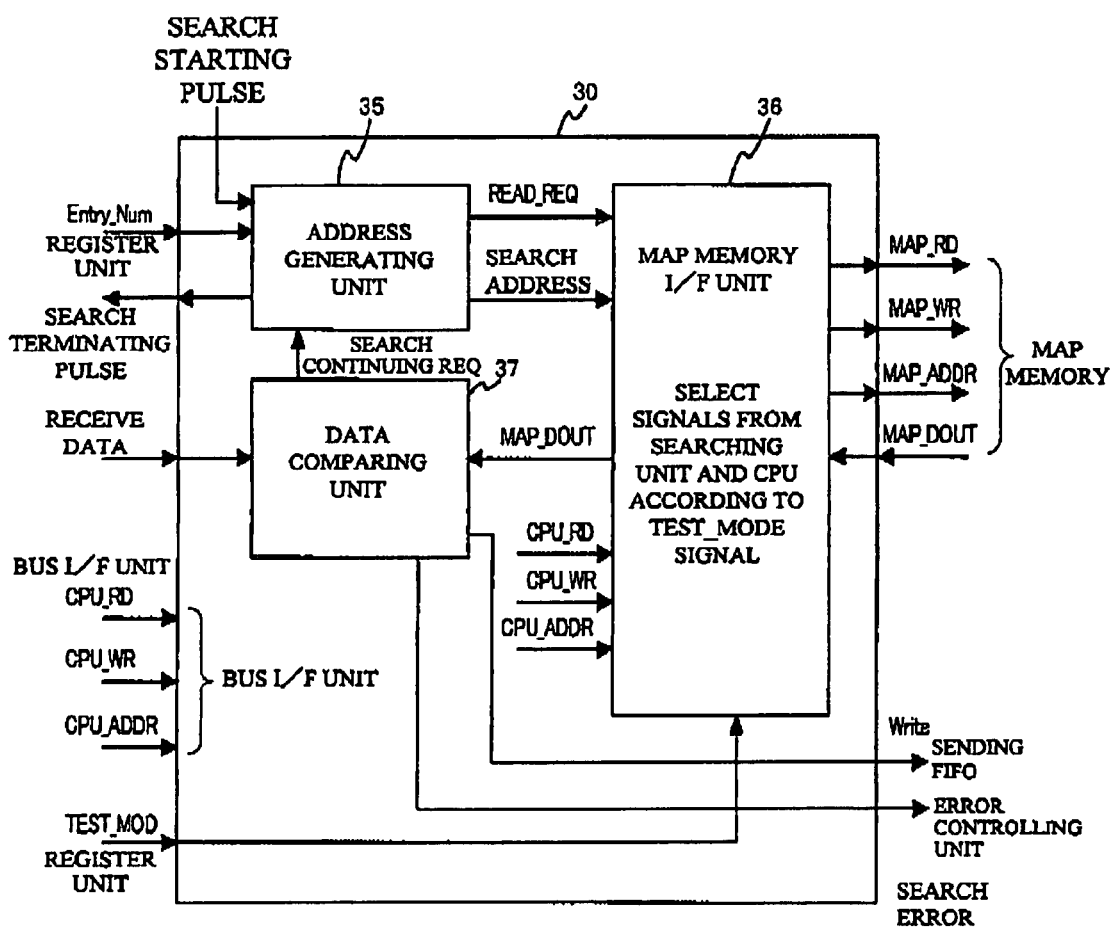
FIG. 23 illustrates the configuration of a search controlling unit.

Next, referring to FIG. 23, the construction of the search controlling unit 30 will be described. As shown in FIG. 23, the search controlling unit 30 is provided with functioning units of an address generating unit 35, a map memory I/F unit 36, and a data comparing unit 37. The address generating unit 35 is provided with an address counter, and sequentially generates addresses of the map memory 13. The map memory I/F unit 36 is an interface unit with the map memory 13, reads out data of the addresses generated by the address generating unit 35, and outputs the data to the data comparing unit 37. The data comparing unit 37 compares and determines whether or not an address which matches data (CAN_ID) read in from the receiving control unit 15 is registered at the routing map in the map memory 13.

Figure 24:
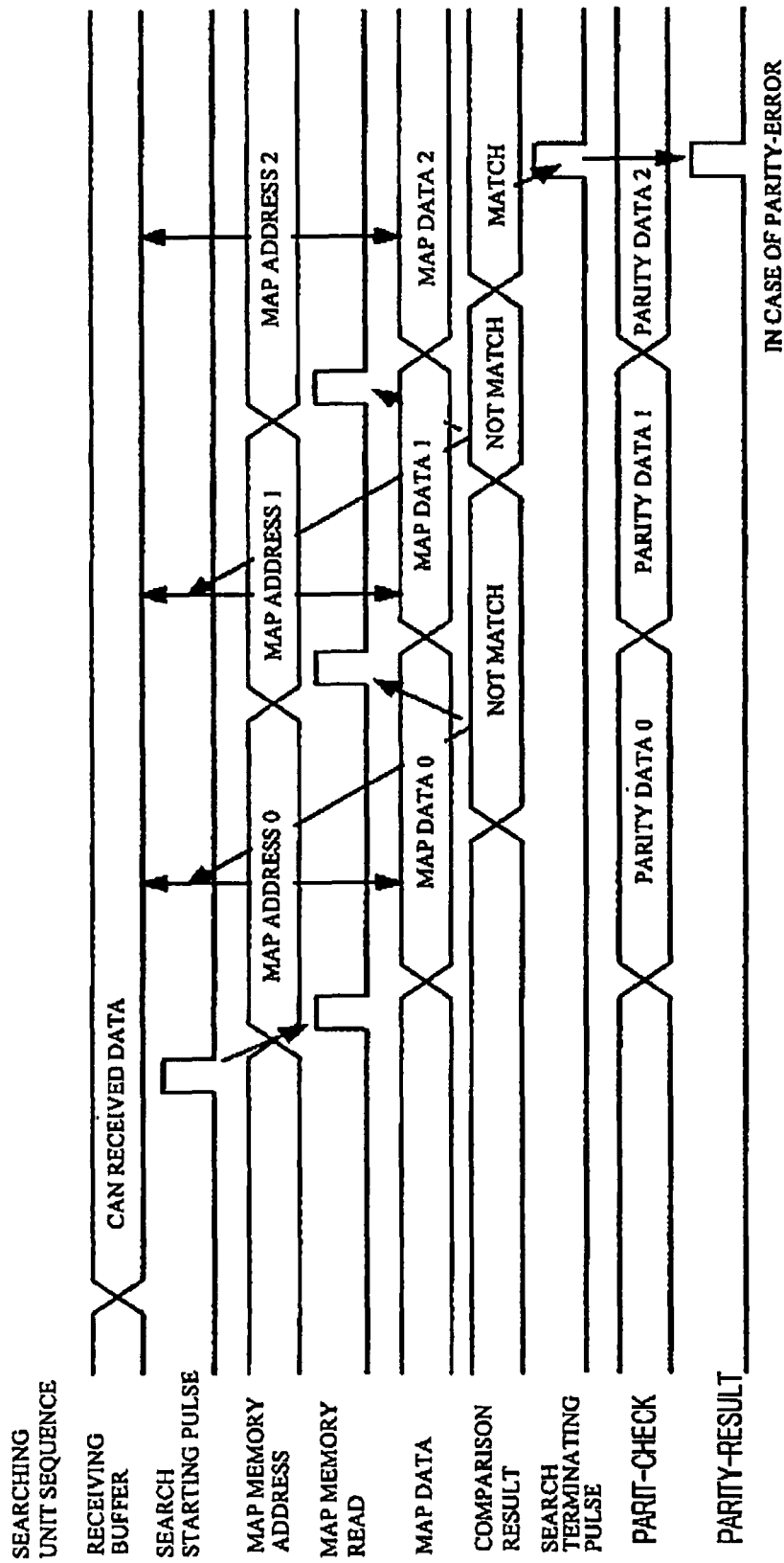
FIG. 24 is a time chart indicative of operation timing of a search controlling unit.

Referring to the timing chart shown in FIG. 24, operation timing of the search controlling unit 30 will be described. Data received by the CAN is stored in the receiving control unit 15, and then a search starting pulse is input from the receiving control unit 15 to the address generating unit 35. The address generating unit 35 sequentially generates addresses (map addresses 0, 1, 2, . . . shown in FIG. 24) of the map memory 13 by using the search starting pulse as a trigger. A map address generated by the address generating unit 35 is input to the map memory I/F unit 36, and then a map data is read out (map data 0, 1, 2, . . . shown in FIG. 24) from the map memory 13 synchronizing with a map memory READ signal. The data comparing unit 37 compares received data (CAN_ID) with an ID read out from the map memory 13, and thus determines whether the ID matches therewith or not. If they do not match, a search continuing request signal is output from the data comparing unit 37 to the address generating unit 35, and thus data comparison is continued. If they match, a search continuing request signal is not output to the address generating unit 35 any more, and a search terminating pulse is output from the address generating unit 35. At the comparing unit 37, parity check of a routing map as well as data comparison is performed. Parity check of data (the CAN_ID, the mask information, the destination of channel, the sending FIFO number, and the data label) recorded in an entry where the ID matches is performed. In a case of parity check error, a Parity ERR signal indicative of an error is output to the CPU 2.

Figure 25A:
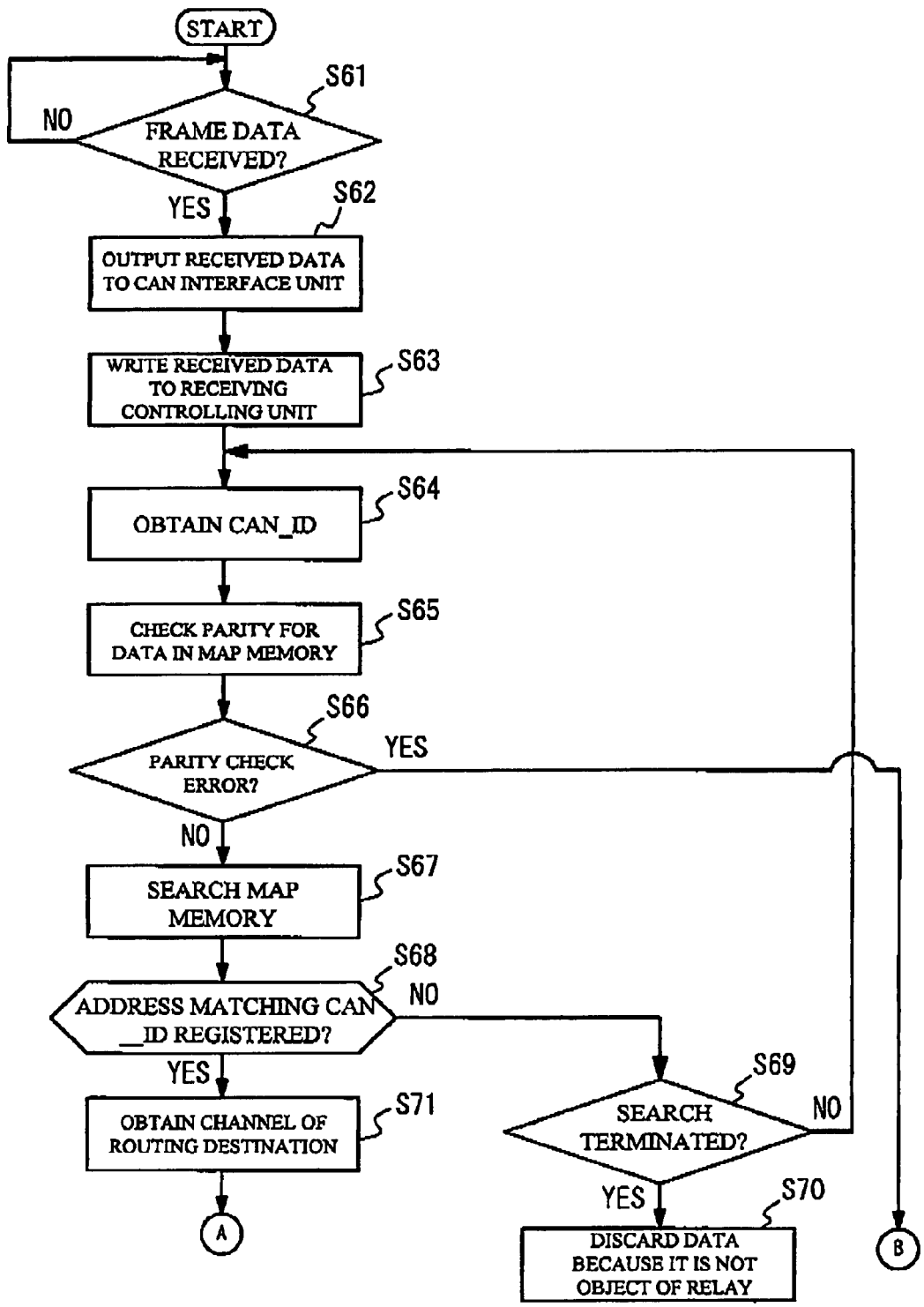
FIGS. 25A and 25B are flowcharts of operation procedure of an in-vehicle gateway apparatus.
Figure 25B:
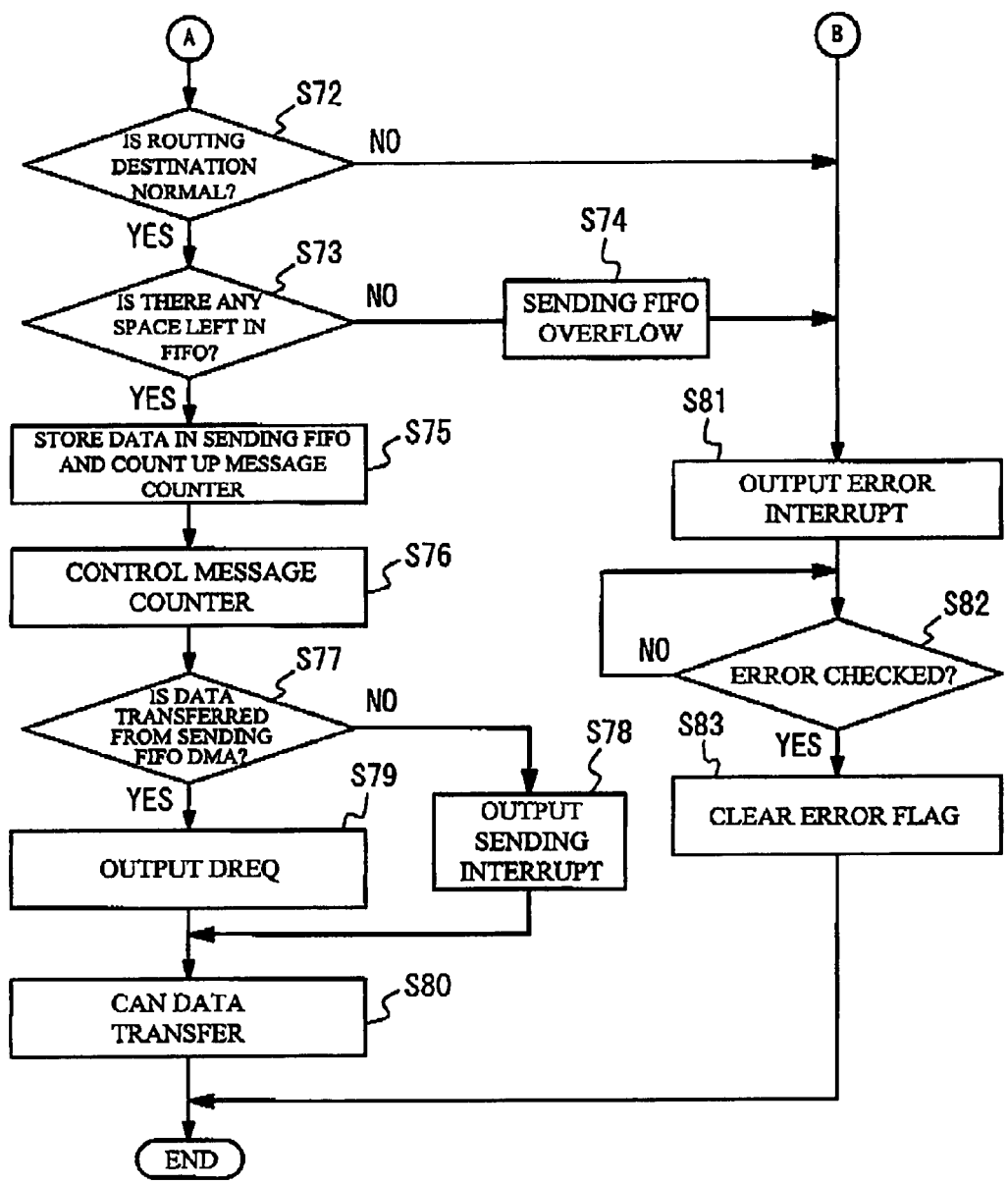
Figure 26:
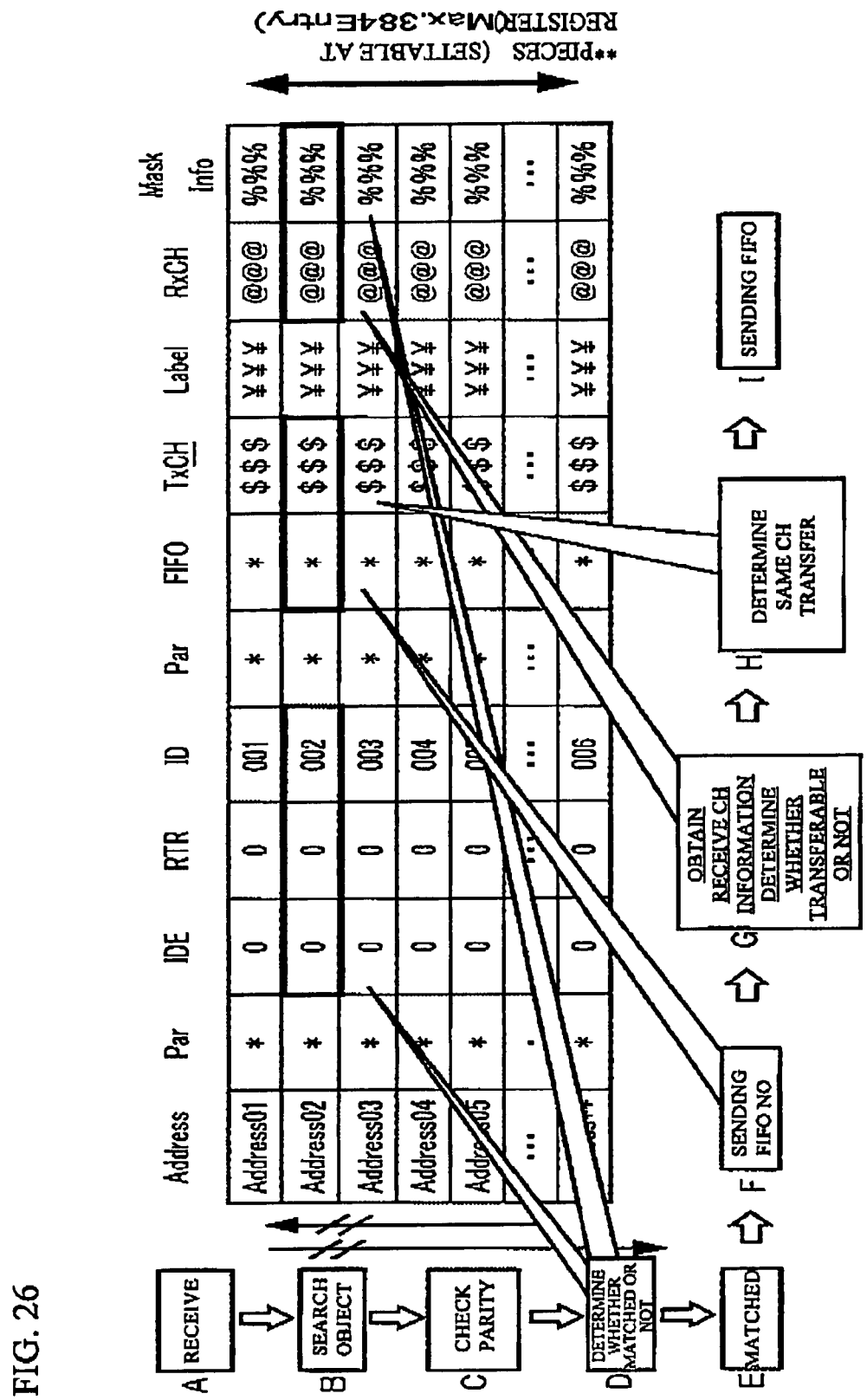
FIG. 26 schematically illustrates operation of a search controlling unit.

Referring to the flowcharts shown in FIGS. 25A and 25B and FIG. 26, the operation procedure will be described. It should be noted that the controlling procedure does not refer to that of the CPU 2, but to hardware operation of the gateway hardware macro section 17. FIG. 26 also schematically shows a routing map recorded in the map memory 13 and routing procedure of the search controlling unit 30 by using the routing map. If frame data is received (YES at step S61, or A: receive shown in FIG. 26), the CAN 9 outputs the received frame data to the CAN interface unit B (step S62) and then the frame data is written from the CAN interface unit 8 to the receiving control unit 15 (step S63). The CAN 9 inputs the frame data at its message box, and then outputs an interrupt signal to the search engine unit 11. The search engine unit 11 retrieves the frame data from the message box (B shown in FIG. 26), by using the interrupt signal as a trigger, and then stores the frame data in the receiving control unit 15. The search engine unit 11 retrieves CAN_ID, DLC (data link control), and data (step S64), synchronizing with a search starting pulse (SCH_STRT) from the receiving control unit 15. It should be noted that all the frame data recorded in the receiving control unit 15 is search object, and therefore is input to the search engine unit 11. FIG. 27A shows the construction of received frame data. Frame data is, as shown in FIG. 27A, provided with various fields of IDE (indicative of the format type), RTR (indicative of the frame type), EPC (the result of parity check error), standard ID or extended ID, Data, Label 0, Res (Reserved), DLC (data link control), Label 1, Data, time stamp, Data. The standard ID or the extended ID is referred to as CAN_ID.

Next, the search engine unit 11 performs parity check for data in the map memory 13 (step S65) (see C in FIG. 26). In searching the map memory 13, map memory information is read out at an address value derived from the binary-tree search. Here, parity check is performed in order to determine whether map memory data read out has a garbled bit or not. If the result of parity check indicates an error (YES at step S65), an interrupt signal notifying an routing error is output to the CPU 2 (step S81). The error is detected thereafter by the CPU (YES at step S82), and then an error flag is cleared (step S83).

Figure 28:
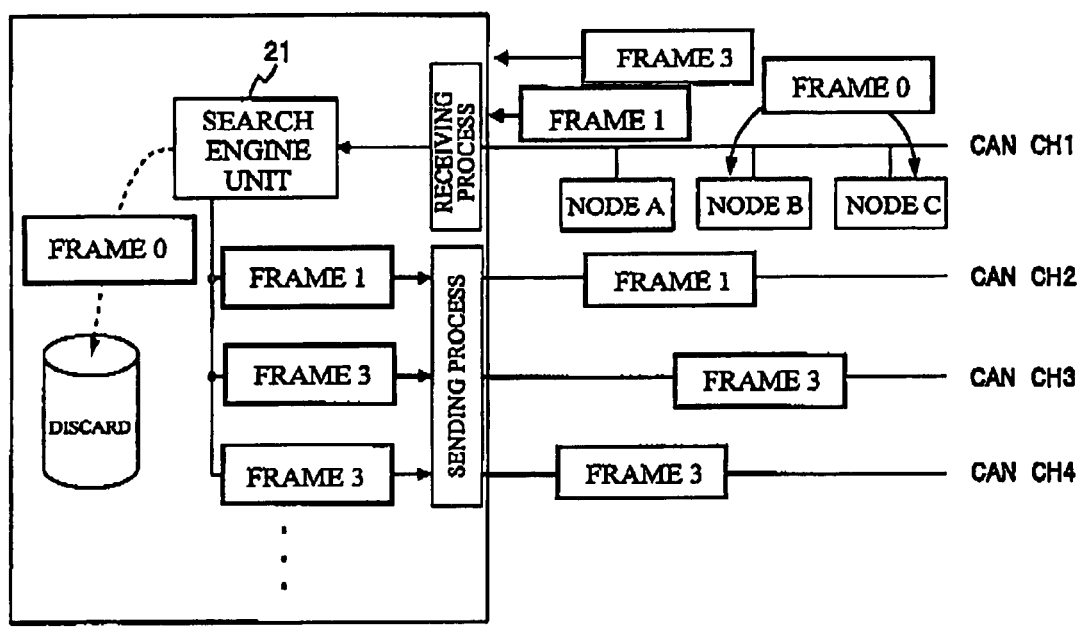
FIG. 28 schematically illustrates operation of a search engine unit.

The search engine unit 11 then searches the map memory 13 (step S67), and determines whether or not the received frame data is an object of routing (step S68) (C, D shown in FIG. 26). The search engine unit 11 retrieves CAN_ID, DLC, and data from the frame data, and determines whether or not the ID which matches the received CAN_ID is recorded in the routing map (step S68). If the ID which matches the CAN_ID is not recorded in the routing map (NO at step S68), whether or not search is terminated is determined (step S69). If search is not terminated (NO at step S69), searching the map memory 13 at step S65 is performed again and then whether or not the ID which matches the CAN_ID is registered at the map memory is determined. If searching is terminated (YES at step S69), the data is out of object of relay and therefore the data is discarded as shown in FIG. 28 (step S70).

If the ID which matches the CAN_ID is, as shown in C of FIG. 26, registered at the routing map (YES at step S68, or E: match shown in FIG. 26), the search engine unit 11 retrieves from the map memory 13 the number of the sending FIFO (F of FIG. 26) which stores the frame data and the information of the destination channel (step S71) (G of FIG. 26) to which the frame data is transferred. The search engine unit 11 obtains the information of the destination channel, and then determines whether or not the destination channel is valid. If the destination channel is determined to be invalid (NO at step S72), an interrupt signal notifying a routing error is output to the CPU 2 (step S81). If the CPU thereafter detects the error (YES at step S82), an error flag is cleared (step S83). If the destination channel is determined to be valid (YES at step S72), a data label is added to the frame data as shown in FIG. 27B and is output to the sending FIFO 21 (I of FIG. 26).

In the sending FIFO 21, the number of columns for storing frame data is set. Therefore, if frame data more than the set number are transferred, there is not any more space left at the sending FIFO 21. If the frame data is written to the sending FIFO 21 in the status where there is not any more space left at the sending FIFO 21 (NO at step S73), the latest value of the frame data overwrites the oldest field at the sending FIFO and thus the sending FIFO is overflowed (step S74). If the search engine unit 21 determines the sending FIFO is overflowed, the search engine unit 11 outputs an interrupt signal of overflow to the CPU 2 (step S81). IF the CPU thereafter detects the error (YES at step S82), an error flag is cleared (step S83). It should be noted that a data label which is added to the frame data at the search engine unit 11 will be described in detail below.

If there is space area left at the sending FIFO 21 (YES at step S73), the frame data is written to the sending FIFO 21 by arbitration of a FIFO arbitrating unit 23 and the message counter 22 is counted up (step S75). A count value of the message counter 22 reaches a predetermined set value (step S76), and then the search engine unit 11 outputs an interrupt signal to the CPU 2. If, thereafter, data transfer is performed by control of the DMA controller 7 (YES at step S77), a data requesting signal (DREQ) is output to the DMA controller 7 (step S79). The DMA controller 7 inputs the signal, and then sends the data from the sending FIFO 21 (step S80). If data transfer is performed by control of the CPU 2 (NO at step S77), the search engine unit 11 outputs a sending interrupting signal to the CPU 2 (step S78). The CPU 2 performs sending process of the frame data after routing by software processing by program control (step S80).

Figure 29:
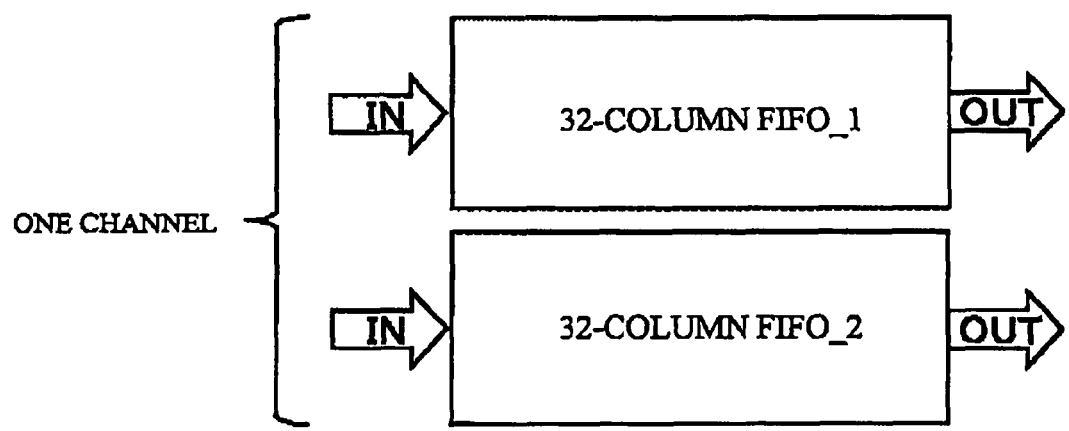
FIG. 29 is a drawing indicative of sending FIFOs for one channel.

FIG. 29 shows the construction of the sending FIFO 21. The sending FIFO 21 is, as shown in FIG. 29, provided on the basis of two 32-columned sending FIFOs for each channel. In the present embodiment, one frame of information is assumed to be stored at one column of the sending FIFO 21. It should be noted that the number of columns and rows at the sending FIFO 21 is not limited thereto, and the number may be modified optionally as desired according to the number of frames and channels, and the communication speed to be inputted.

Figure 30:
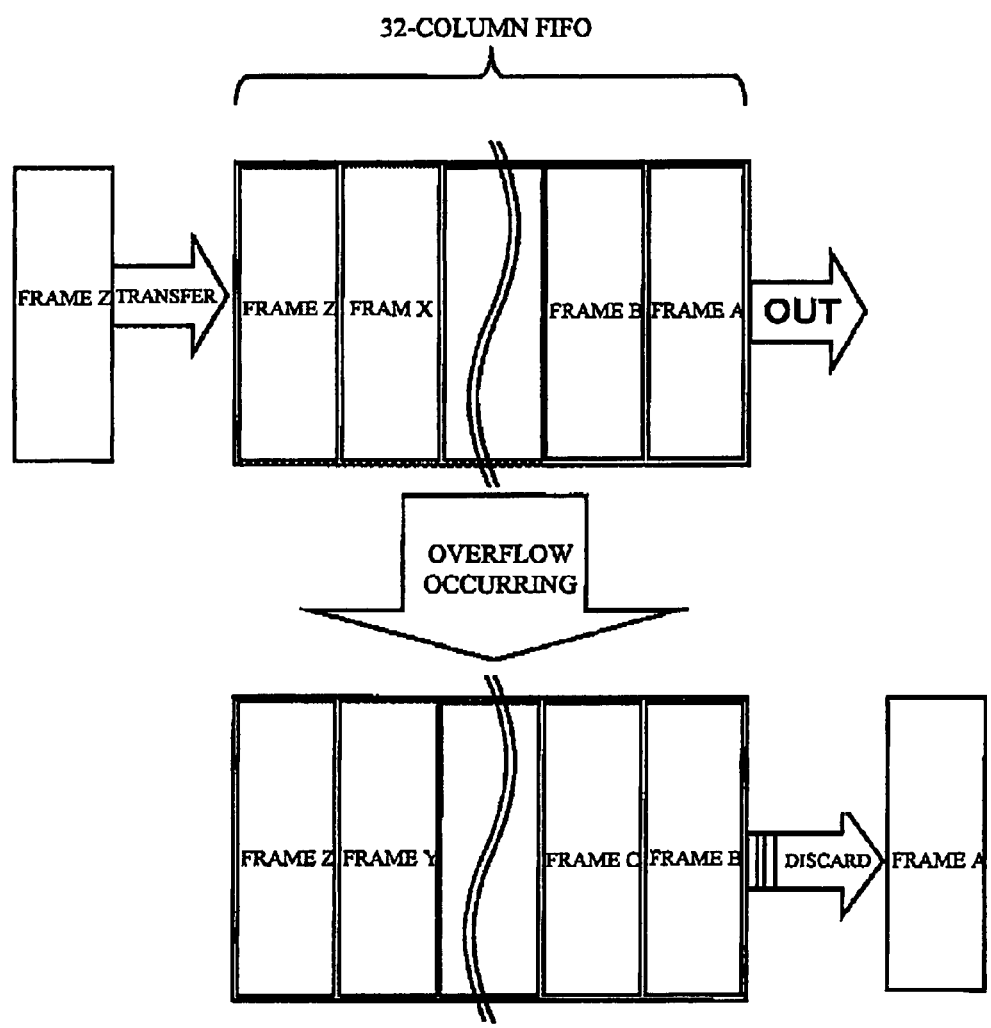
FIG. 30 is a drawing for describing processing when a FIFO is overflowed.

Frame data buffered at the sending FIFO 21 is counted and displayed at the message counter 22. A count value of the message counter 22 is the number of a frame which is guaranteed to be able to retrieve from the sending FIFO 21. The search engine unit 11 outputs an interrupt signal to the CPU 2 when a count value of the message counter 22 reaches a value set at the registering unit 31. The CPU 2 may retrieve as many frames as the count number from the sending FIFO 21. The CPU 2 receives the interrupt signal and reads out a count value of the message counter 22 of all the FIFOs of the corresponding channels by software processing by program control, and thus detects how many times the CPU 2 should read out from which sending FIFO. If frame data may not be read out from the sending FIFO 21 and the sending FIFO 21 is full for some reason or other, as shown in FIG. 30, data at the oldest field is discarded, and then the latest data is written to the sending FIFO 21.

Writing of a frame registered at the sending FIFO 21 to the receiving control unit 15 is performed either by software processing by a program or by transfer control by the DMA controller 7. It should be noted that processing which may not be unified as the gateway apparatus, such as fail processing and processing of modifying CAN_ID or data, may also be performed by software processing. It should be noted that this software processing is implemented by having the CPU 2 read out a program stored in the ROM 3 and perform processing according to the program.

Figure 31:
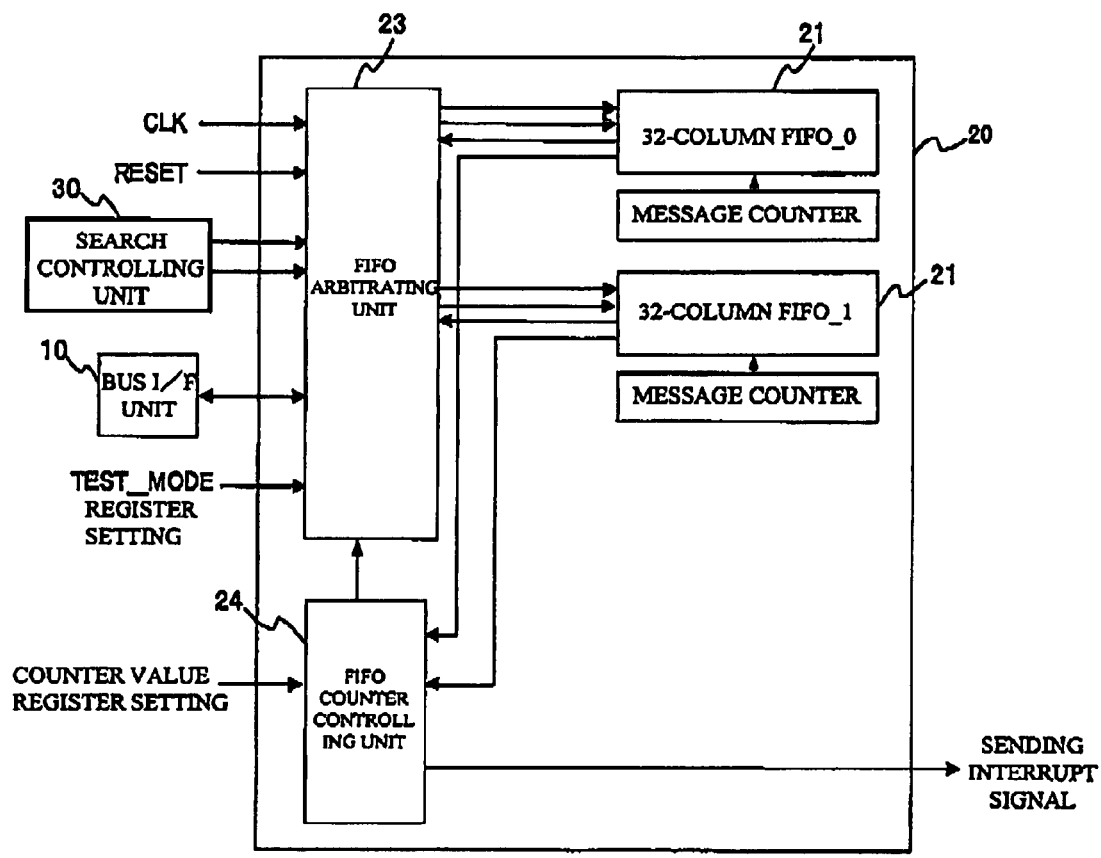
FIG. 31 illustrates the configuration of a sending FIFO unit.

FIG. 31 shows the connecting configuration of the FIFO arbitrating unit 23 and the sending FIFO 21. A FIFO counter controlling unit 24 shown in FIG. 31 controls the message counter 22. If frame data is output simultaneously from a plurality of search engine units 11, the FIFO arbitrating unit 23 outputs frame data to the sending FIFO 21 according to a set order of priorities.

Figure 32:
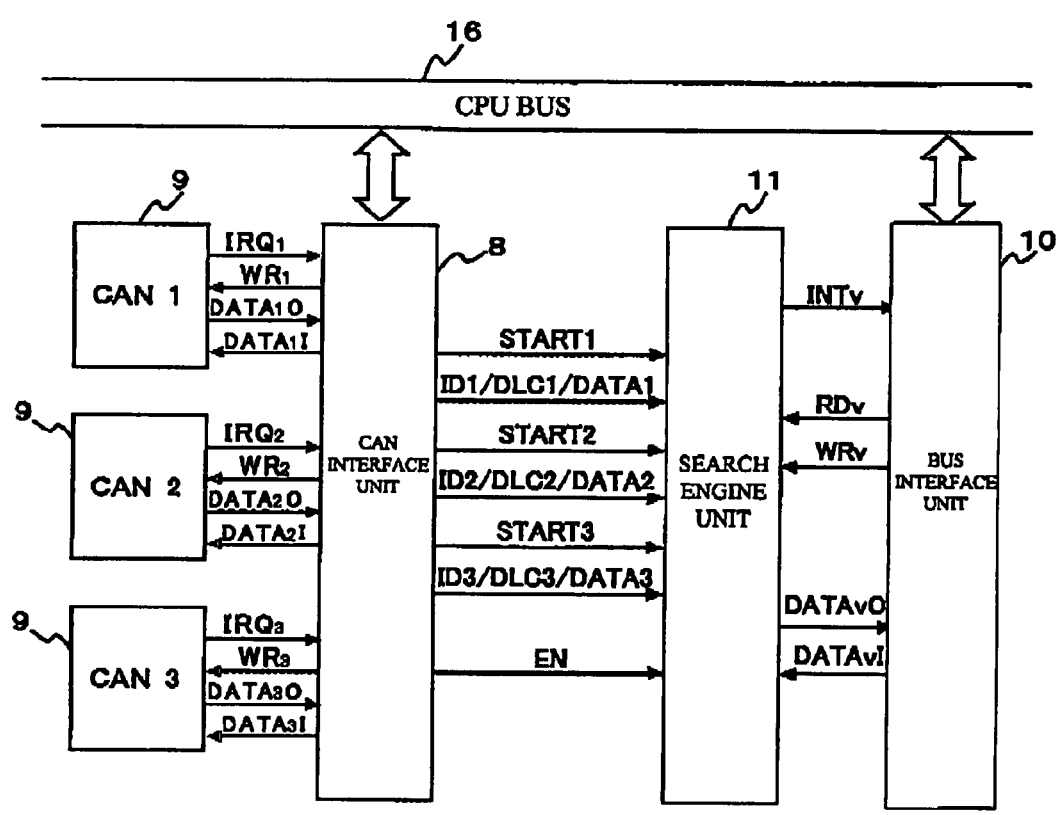
FIG. 32 is a drawing indicative of signals sent at CAN communication between a CAN, a CAN interface unit, a search engine unit, and a bus interface unit.
Figure 33:
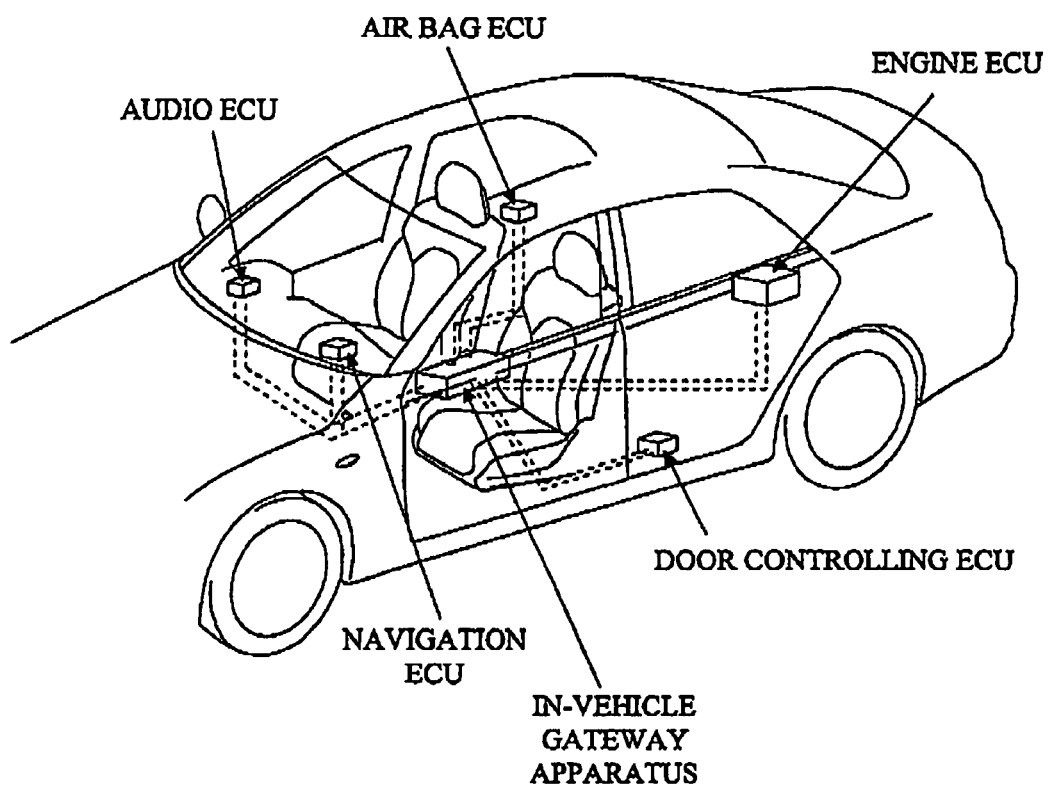
FIG. 33 illustrates the connecting configuration of a plurality of ECUs and an in-vehicle gateway apparatus.

FIG. 32 shows signals which are output in communications between the CAN 9, the CAN interface unit 8, the search engine unit 11, and the bus interface unit 10. From the CAN 9 to the CAN interface unit 8 are output $IRQ_1$ (an interrupt signal from CAN_1), $WR_1$ (a register writing-in signal), DATAxO (a register reading-out signal), and DATAxI (register writing—in signal). Also from other CAN_2 and CAN_3 are output the similar signals. The CAN interface unit 8 outputs STARTx (a routing starting signal), IDx, DLCx, DATAx, and EN (an operation permission signal for the search engine unit 11) to the search engine unit 11.

If a predetermined number of frame data is accumulated at the sending FIFO 21, INTV (a gateway interrupting signal) is output from the search engine unit 11 to the CPU 2. The CPU 2 outputs RDv (a register reading out signal) and WRv (a register writing in signal), and then reads out a count value of the message counter 22. Then, by DATAvO (a register (including the sending FIFO) reading-out signal) and DATAvI (a register (including the sending FIFO) writing-in signal), writing in and reading out of data are performed.

Now, a data label added to the search engine unit 11 will be described. A data label has no meanings in terms of hardware configuration of the search engine unit 11, and therefore has nothing to do directly with routing, however, is added to frame data and then transferred as shown in FIG. 27B. A data label is specified by 8 bit. The data label is added to frame data in routing processing, and is transferred to the sending FIFO 21. A data label is obtained by software processing by program control, and used as a pointer for referring to a frame information table recorded in the ROM 3. Thus, it is not necessary to perform re-searching of frame information by software processing, and therefore time spent for sending process by software may be reduced.

The aforementioned examples are examples of preferred embodiments of the present invention. However, it should be appreciated that the examples are non-limiting and that various modifications may be implemented without deviating from the spirit and the scope of the present invention. For example, the present invention is useful for an in-vehicle gateway apparatus, but not limited thereto.

What is claimed is:

1. A gateway apparatus for performing transfer control of frame data between communication channels, the gateway apparatus comprising:
a first storage portion having transmission storage portions and reception storage portions, each of the transmission storage portions and the reception storage portions being provided for each of the multiple communication channels;
a routing unit that retrieves frame data from a reception storage portion and that divides the frame data into frame data to be sent to a controller and the frame data to be sent to a hardware search engine according to the reception storage portion from which the frame data is retrieved, the frame data being sorted according to an identification number respectively recorded in the frame data and being respectively stored in the reception storage portion;
a time stamp adding unit for adding time stamp information to the frame data sent to the hardware search engine;
the controller, controlled by software programs, that receives the frame data sent from the routing unit, determines a communication channel among the multiple communication channels being used by a node to which the frame data is sent based on information recorded in the frame data and that transmits the frame data to a transmission storage portion corresponding to the communication channel;
the hardware search engine that receives the frame data to which the time stamp is added sent from the time stamp adding unit, that determines a communication channel being used by a node to which the frame data is sent based on information recorded in the frame data and that transmits the frame data to one of the storage regions in a second storage portion corresponding to the communication channel, each of the storage regions being provided for each of the multiple communication channels; and
a counting unit that counts the frame data stored in the second storage portion,
wherein the controller determines whether the frame data is stored in the second storage portion based on a count value counted by the counting unit, calculates time lag by comparing the time stamp information added to the frame data retrieved from the second storage portion with a current time, compares the time lag with a first threshold value and a second threshold value, deletes the frame data stored in the second storage portion when the time lag exceeds the first threshold value, and transmits the frame data stored in the second storage portion to the transmission storage portions with priority over the frame data sent from the routing unit when the time lag is equal to or less than the first threshold value and is more than the second threshold value.

2. The gateway apparatus according to claim 1, wherein the time stamp adding unit adds the time stamp information to the frame data in the communication channels.

3. The gateway apparatus according to claim 1, further comprising:
a resolution modifying unit for modifying a resolution of time information which is added as the time stamp information.

4. The gateway apparatus according to claim 1, further comprising:
a selector for adjusting timing to output the frame data transferred from the plurality of communication channels of the transfer source to the hardware search engine.

5. The gateway apparatus according to claim 1, wherein:
the controller transfers the frame data stored in the transmission storage portions to transmit units provided for each of the communication channels; and
the transmit units transmit the frame data to nodes through each of the communication channels.

6. The gateway apparatus according to claim 1, wherein the hardware search engine makes a decision of overflow of the second storage portion when at least one storage region in the second storage portion has no area to store the frame data effectively and sends a message that indicates breaking out of the overflow of the second storage portion to the controller.

7. A data managing method implemented in a gateway apparatus, comprising:
performing a first routing process that retrieves frame data from a reception storage portion, and that divides the frame data into frame data to be sent to a controller and the frame data to be sent to a hardware search engine according to the reception storage portion from which the frame data is retrieved, the frame data being sorted according to an identification number respectively recorded in the frame data and being stored in the reception storage portion;
adding time stamp information to the frame data sent to the hardware search engine;
performing a second routing process executed by the controller that receives the frame data sent from the first routing process, that determines a communication channel among the multiple communication channels being used by a node to which the frame data is sent based on information recorded in the frame data, and that transmits the frame data to a transmission storage portion corresponding to the communication channel;
performing a third routing process executed by the hardware search engine that receives the frame data to which the time stamp is added, that determines a communication channel being used by a node to which the frame data is sent based on information recorded in the frame data, and that transmits the frame data to one of a plurality of storage regions in a second storage portion corresponding to the communication channel, each of the storage regions being provided for each of the multiple communication channels;
performing a counting process that counts the frame data stored in the second storage portion;
performing a determining process, executed by the controller, that determines whether the frame data is stored in the second storage portion based on a count value counted by the counting process;
performing a calculating process, executed by the controller, that calculates time lag by comparing the time stamp information added to the frame data retrieved from the second storage portion with a current time;
performing a comparing process, executed by the controller, that compares the time lag with a first threshold value and a second threshold value;

performing a data deleting process, executed by the controller, that deletes the frame data stored in the second storage portion when the time lag exceeds the first threshold value; and performing a transmitting process, executed by the controller, that transmits the frame data stored in the second storage portion to the transmission storage portions with priority over the frame data sent from the first routing process when the time lag is equal to or less than the first threshold value and is more than the second threshold value.

* * * * *

UNITED STATES PATENT AND TRADEMARK OFFICE
CERTIFICATE OF CORRECTION

| | | |
|---|---|---|
| PATENT NO. | : 8,027,352 B2 | Page 1 of 1 |
| APPLICATION NO. | : 11/976546 | |
| DATED | : September 27, 2011 | |
| INVENTOR(S) | : Kaoru Noumi et al. | |

It is certified that error appears in the above-identified patent and that said Letters Patent is hereby corrected as shown below:

On the Title Page, Item (73), please change "Renesas Technology Corporation" to "Renesas Electronics Corporation."

Signed and Sealed this
Sixth Day of August, 2013

Teresa Stanek Rea
*Acting Director of the United States Patent and Trademark Office*